United States Patent [19]
Oyamada et al.

[11] Patent Number: 5,617,333
[45] Date of Patent: Apr. 1, 1997

[54] METHOD AND APPARATUS FOR TRANSMISSION OF IMAGE DATA

[75] Inventors: Ouichi Oyamada; Akifumi Arayashiki; Hiroyo Sato; Eiji Yokokawa, all of Sapporo, Japan

[73] Assignee: Kokusai Electric Co., Ltd., Tokyo, Japan

[21] Appl. No.: 346,922

[22] Filed: Nov. 23, 1994

[30] Foreign Application Priority Data

| Nov. 29, 1993 | [JP] | Japan | 5-320904 |
| Dec. 22, 1993 | [JP] | Japan | 5-345626 |
| Dec. 27, 1993 | [JP] | Japan | 5-332839 |
| Jul. 25, 1994 | [JP] | Japan | 6-192281 |

[51] Int. Cl.$^6$ ........................................ H03M 3/00
[52] U.S. Cl. ........................... 364/514 R; 371/2.1
[58] Field of Search ..................... 364/514 A, 514 R; 371/2.1, 30, 35, 37.1; 341/58, 107; 382/56, 57; 348/608

[56] References Cited

U.S. PATENT DOCUMENTS

| 4,914,745 | 4/1990 | Strehl . | |
| 4,968,985 | 11/1990 | Riggle et al. | 364/514 R |
| 5,369,641 | 11/1994 | Dodt et al. | 371/2.2 |
| 5,396,239 | 3/1995 | McMahon et al. | 341/58 |
| 5,475,388 | 12/1995 | Gormish et al. | 341/107 |

FOREIGN PATENT DOCUMENTS

| 0345871 | 12/1989 | European Pat. Off. . |
| 0514188 | 11/1992 | European Pat. Off. . |
| 0545711 | 6/1993 | European Pat. Off. . |
| 0557684 | 9/1993 | European Pat. Off. . |
| 2120494 | 11/1983 | United Kingdom . |
| 2182523 | 5/1987 | United Kingdom . |
| 2226927 | 7/1990 | United Kingdom . |
| 2263373 | 7/1993 | United Kingdom . |

*Primary Examiner*—Emanuel T. Voeltz
*Assistant Examiner*—Thomas Peeso
*Attorney, Agent, or Firm*—Sixbey, Friedman, Leedom & Ferguson; Gerald J. Ferguson, Jr.; Bradley D. Blanche

[57] ABSTRACT

In an improved image data transmission system, an image data partitioning unit is provided at the transmitter section to partition an input image data into a predetermined number of picture elements (blocks) so that same picture elements of the image data can be subject to source image encoding and forward error correction encoding. At the receiver section, picture elements in each of the data blocks are subject to error correction decoding and source image decoding. The receiver section is provided with an image data interpolator which works, when an transmission error is detected, to interpolate with a substitution data the data in a block in which the error has been detected or data in other block to which the error has been propagated as it is. After the interpolation, a reconstructed image data is delivered.

27 Claims, 26 Drawing Sheets

MCU (8×8 picture elements)

Transmission side

Reception side

Correctly decoded

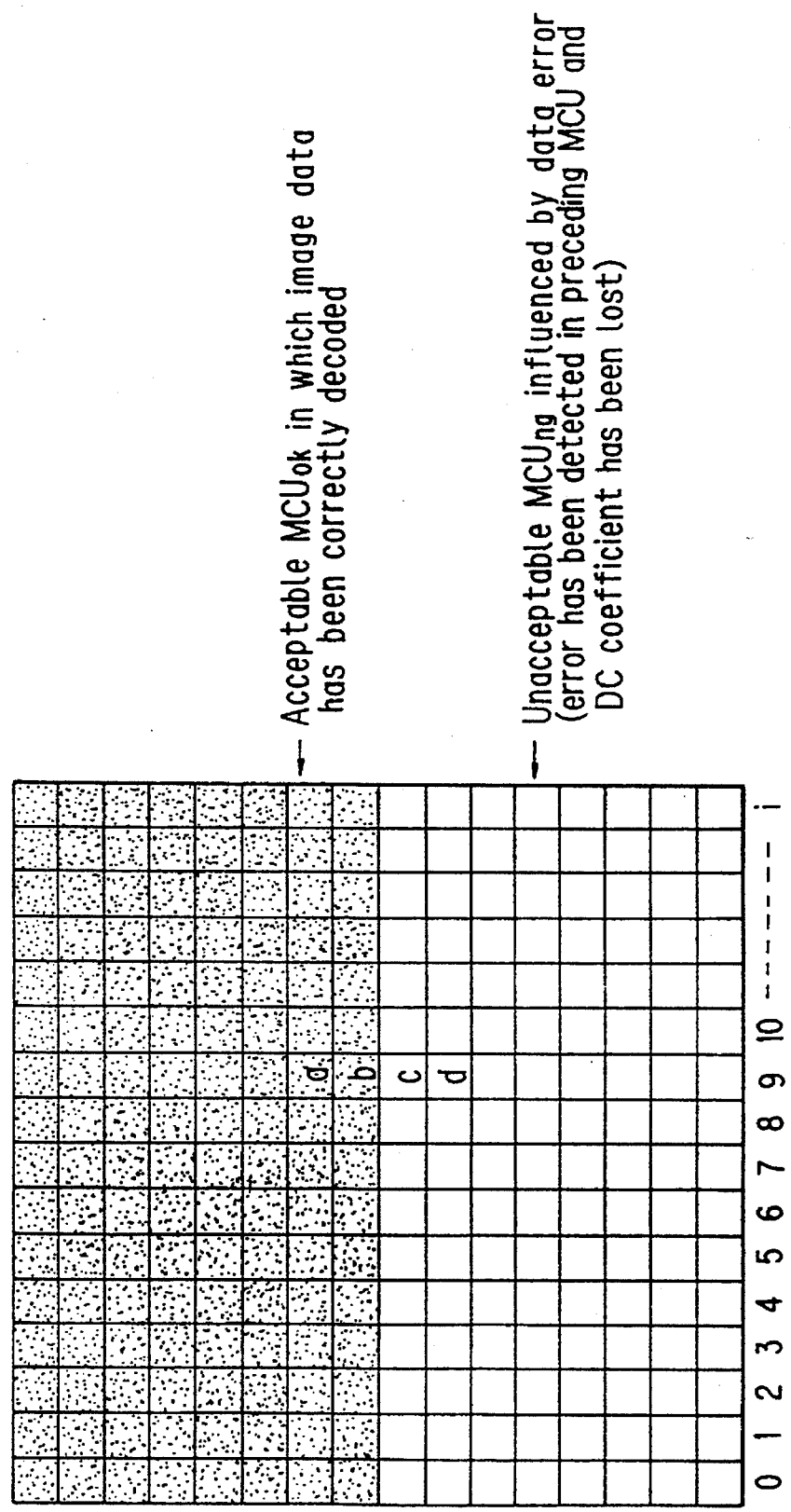

FIG. 17A

| 0 | 0 | 0 | 0 | 0 | 0 | 0 | 0 | 0 |
|---|---|---|---|---|---|---|---|---|
| 0 | 0 | 0 | 0 | 60 | 0 | 0 | 0 | 0 |
| 0 | 0 | 0 | 60 | 120 | 60 | 0 | 0 | 0 |
| 0 | 0 | 60 | 120 | 180 | 120 | 60 | 0 | 0 |
| 0 | 60 | 120 | 180 | 200 | 180 | 120 | 60 | 0 |
| 0 | 0 | 60 | 120 | 180 | 120 | 60 | 0 | 0 |
| 0 | 0 | 0 | 60 | 120 | 60 | 0 | 0 | 0 |
| 0 | 0 | 0 | 0 | 60 | 0 | 0 | 0 | 0 |
| 0 | 0 | 0 | 0 | 0 | 0 | 0 | 0 | 0 |

| 0 | 0 | 0 | 0 | 0 | 0 | 0 | 0 | 0 |
|---|---|---|---|---|---|---|---|---|
| 0 | 0 | 0 | 0 | 60 | 0 | 0 | 0 | 0 |
| 0 | 0 | 0 | 60 | 120 | 60 | 0 | 0 | 0 |
| 0 | 0 | 60 | 120 | 180 | 120 | 60 | 0 | 0 |
| 0 | 60 | 120 | 180 | 200 | 180 | 120 | 60 | 0 |
| 0 | 0 | 60 | 120 | | | 0 | 0 | |
| 0 | 0 | 0 | 60 | | | 0 | 0 | |
| 0 | 0 | 0 | 0 | | | 0 | 0 | |
| 0 | 0 | 0 | 0 | 0 | 0 | 0 | 0 | 0 |

| 0 | 0 | 0 | 0 | 0 | 0 | 0 | 0 | 0 |
|---|---|---|---|---|---|---|---|---|
| 0 | 0 | 0 | 0 | 60 | 0 | 0 | 0 | 0 |
| 0 | 0 | 0 | 60 | 120 | 60 | 0 | 0 | 0 |
| 0 | 0 | 60 | 120 | 180 | 120 | 60 | 0 | 0 |
| 0 | 60 | 120 | 180 | 200 | 180 | 120 | 60 | 0 |
| 0 | 0 | 60 | 120 | 150 | 135 | 90 | 0 | 0 |
| 0 | 0 | 0 | 60 | 100 | 90 | 60 | 0 | 0 |
| 0 | 0 | 0 | 0 | 50 | 45 | 30 | 0 | 0 |
| 0 | 0 | 0 | 0 | 0 | 0 | 0 | 0 | 0 |

A

| 0 | 0 | 0 | 0 | 0 | 0 | 0 | 0 | 0 |
|---|---|---|---|---|---|---|---|---|
| 0 | 0 | 0 | 0 | 60 | 0 | 0 | 0 | 0 |
| 0 | 0 | 0 | 60 | 120 | 60 | 0 | 0 | 0 |
| 0 | 0 | 60 | 120 | 180 | 120 | 60 | 0 | 0 |
| 0 | 60 | 120 | 180 | 200 | 180 | 120 | 60 | 0 |
| 0 | 0 | 60 | 120 | 144 | 131 | 77 | 0 | 0 |
| 0 | 0 | 0 | 60 | 63 | 60 | 20 | 0 | 0 |
| 0 | 0 | 0 | 0 | 10 | 0 | 0 | 0 | 0 |
| 0 | 0 | 0 | 0 | 0 | 0 | 0 | 0 | 0 |

A

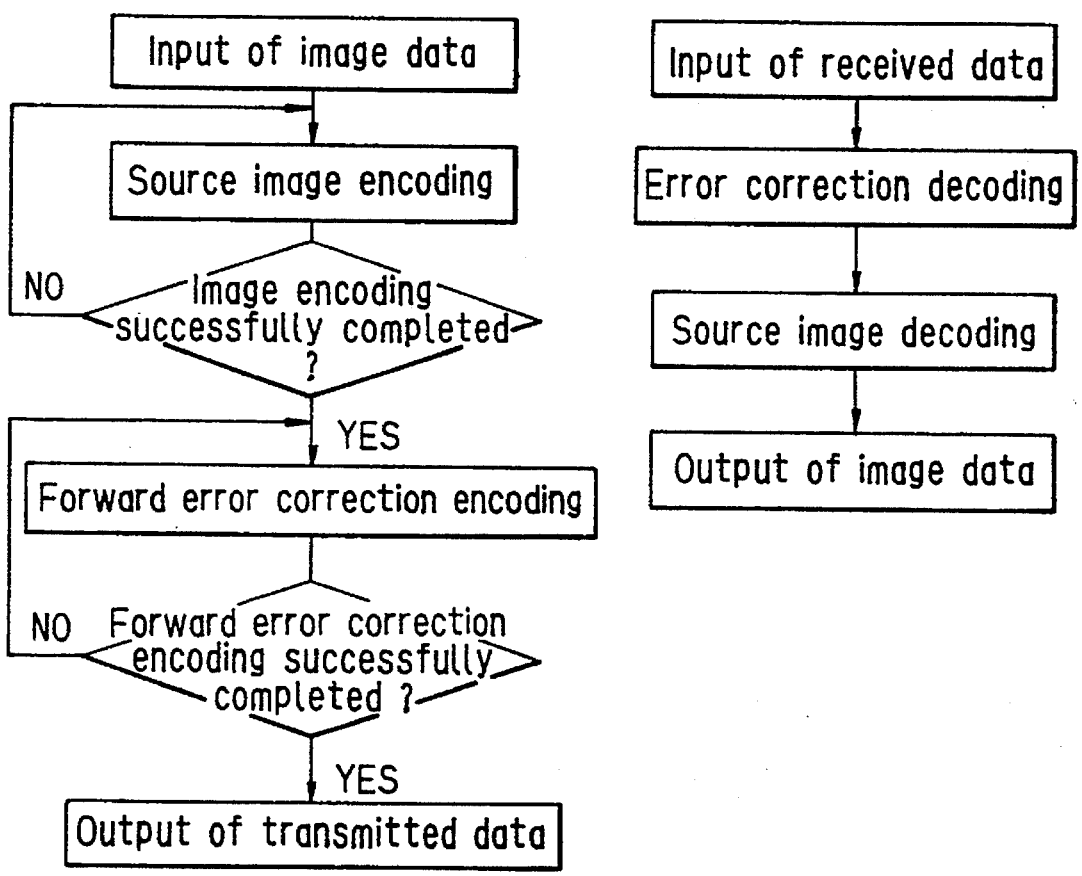

MCU (8×8 picture elements)

Transmission side a

Reception side

Not correctly decoded

Original image

⟨Transmission side⟩

Reproduced image

⟨Reception side⟩

METHOD AND APPARATUS FOR TRANSMISSION OF IMAGE DATA

BACKGROUND OF THE INVENTION a) Field of the Invention

The present invention relates to a method and apparatus for transmission of digital data, and more particularly to a digital image data transmitting method and apparatus suitable for transmission of the digital image data over a low-quality transmission line such as wireless communications network or the like by compressing the digital image data for transmission and expanding them after the transmission. More specifically, the present invention relates to a method and apparatus for transmission of digital image data, in which if an error has taken place or any of the data has been lost in the transmission of digital image data, the error or lost data can be interpolated with a substitution data.

b) Prior Art Statement

A typical conventional image data transmission system will be described with reference to FIGS. 24 through 28. FIG. 24 shows the configuration of the conventional image data transmission system, and FIGS. 25 and 26 show the flow charts, respectively, of the image data transmission.

As shown in FIG. 24, the image data transmission system includes a transmitter section composed of a source image encoder 2 for receiving and encoding an A–D converted input source image data 1, a forward error correction encoder 3 for forward error correction encoding of the coded data to minimize the influence of any transmission loss or error having taken place in the data during transmission over a transmission line 5, and a modulator 4 used to modulate the coded image data to a signal suitable for transmission over the transmission line 5. The source image encoding is effected independently of the error correction encoding, so that any part of the source image data of which any picture element block that could not be coded can be coded for error correction.

The image data transmission system also includes a receiver section composed of a demodulator 6 which demodulates a data received over the transmission line 5 from the transmitter section to provide the digital signal, an error correction decoder 7 for detection of any error in the demodulated signal, and a source image decoder 8 which receives from the decoder 7 the signal having been subjected to the error detection and decodes it to deliver an image data 14 which will be A–D converted to reconstruct the image data.

As shown in the flow chart of the image data transmission in FIG. 25, two kinds of data encoding, namely, the source image encoding and error correction encoding, are done independently of each other and judged serially to have been completed.

Also as shown in the flow chart of the image data reception in FIG. 26, the received data is decoded by reversely following the sequence of the image data transmission.

For the source image encoding, a highly efficient digital encoding is done for the band reduction. For this purpose, the standard ITU-TS T. 81 prescribed by JPEG (Joint Photographic Experts Group) of ITU or the transmission standard in ISO-IS010918, for example, is applied to partition a source image into blocks (MCU=Minimum code unit) each of 8×8 or 16×16 picture elements, have each MCU subjected to an adaptive discrete cosine transform (ADCT), quantize the transformed MCU through division by a quantizing constant (spectral quantizing) and to make a hybrid encoding (ADCT and Huffman encoding in combination) of the quantized MCU, thereby providing a data compressed in bits. In this case, attribute data including an image size, compression rate, compression method adopted, etc. are transmitted as added to the compressed coded data so that the coded data can be correctly decoded in the receiver section.

The data error correction will be briefly described hereinbelow. Image data is transmitted over any one of various transmission lines, wireless or wire. Such image data transmission has a possibility that a short break of the transmission line, noise, distortion or the like may have caused an error in the image data when received by the receiver section. Different from analog audio data and the like, digital image data includes little redundancy. For the transmission of digital image data, therefore, any such data error has to be detected and corrected to assure a constant quality of an image data reconstructed from such data, that is, such an extent of quality that the image data reconstructed after transmission can be read (legible).

One of the conventional error correction methods is such that a part of an image data in which an error has been detected is discarded and taken as lost data. The data is transmitted, received and reconstructed in disregard of the data error or with the data error removed from the entire data. Otherwise, the data is transmitted, received and reconstructed as it is while the data error is having an influence on a next data. In any case, an image data containing an error or short of a requisite part will be transmitted, received and reconstructed while having a kinds of adverse affect on a next data.

In case a low-quality wireless communications network is used as a transmission line in the above-mentioned conventional image data transmission system, however, since the source image encoding and forward error correction encoding are done independently of each other, a complex error correction encoding/request repeat system is required, which makes it difficult to accommodate a higher complexity and speed of the transmission apparatus and an increase of transmission time due to an increased amount of data to be transmitted. Moreover, there arises a problem that though errors can be decreased by the error correction encoding, a residual error, if any, will make it impossible to reconstruct the transmitted image.

In case it is requested to repeat the data transmission because an error has taken place in the preceding data transmission, the request for the repetition of data transmission will add to the transmitting procedure or the amount of data actually transmitted will be considerably larger than that normally transmitted, which will cause the transmission time to vary and an extra time for the re-transmission.

FIGS. 27(A) and 28(B) explain together the configuration of an image transmitted in the conventional image data transmission system; FIG. 27(A) shows an example of original image at the transmitter section and FIG. 27(B) shows an example of the image received by the receiver section. In the conventional source image encoding, a data is compressed in bits. If any error or lack exists in a data part a of MCU as shown in FIG. 27(B), it is impossible to correctly decode and reconstruct the image data even if the subsequent image data can be correctly received. Namely, the error will propagate to the subsequent image data in many cases.

FIGS. 28(A) and 28(B) explain an example of image data reconstruction by concrete possible images; FIG. 28(A)

shows an original image and FIG. 28(B) shows a reconstructed image data. Especially if an error occurs in the attribute of an image data, the image cannot exactly be decoded and expanded as in FIG. 28(B). The incorrect reconstruction in FIG. 28(B) is resulted because the image size has not correctly been received due to a transmission error. In such case, all the data are to be transmitted again. However, the transmission time increases considerably, which will cause the data compression to be meaningless.

Moreover, in the conventional data error correction system, the picture element value of a lost area or an area containing an error is very different from that of an original image and such an area has an influence on and propagates to, subsequent data to be transmitted, so that the original image cannot be reconstructed with a high precision.

SUMMARY OF THE INVENTION

The present invention has an object to overcome the above-mentioned drawbacks of the conventional image data transmission system in which it is difficult to reconstruct an original image because of an error or error propagation taking place during transmission of an image data derived from encoding of a source image over a low-quality transmission line such as wireless network, by providing an image data transmission system by which the image data can be reconstructed with less influence of such an error on the image data reconstruction.

According to one aspect of the present invention, a method for transmission of image data is provided which comprises the steps of transmitting an input digital image data by encoding the source image data, encoding the coded image data for error correction and modulating it for transmission over a transmission line, and demodulating the image data received over the transmission line, decoding it for error correction, decoding it to the source image and providing a reconstructed image data. At the transmitter section, the input data of a source image is partitioned into a predetermined number of data blocks from which the source image can be decoded, each partitioned block is coded for the source image and also coded for correction of an error, if any, in the block, while at the receiver section, each of the received blocks is decoded to detect any error caused in the block during transmission, a block of the image data of which each block has been decoded to the source image that contains a transmission-caused error, or a block to which the error has been propagated as it is, is corrected with a picture element value estimated from the correlation of the block in consideration with its associated blocks and then the image data is reconstructed.

According to another aspect of the present invention, a method for transmission of image data is provided in which an input digital image data is transmitted by encoding the source image data, encoding the coded image data for error correction and modulating it for transmission over a transmission line, and is reconstructed by demodulating the image data received over the transmission line, decoding it for error correction and decoding it to the source image, comprising the steps of partitioning the input data of a source image into a predetermined number of data blocks from which the source image can be decoded; encoding each partitioned block for the source image and also encoding for correction of an error, if any, in the block; decoding each of the received blocks to detect any error caused in the block during transmission; interpolating a block of the image data of which each block has been decoded to the source image that contains a transmission-caused error, or a block to which the error has been propagated as it is, with a previously stored correction (substitution) block as set in the place of the block containing the error by discarding the error block; and then reconstructing the image data.

According to a still another aspect of the present invention, an image data transmission/reception apparatus is provided which comprises a transmitter section having an image data partitioning unit which partitions an input image data into a predetermined number of blocks which can be decoded to the source image, a source image encoder which encodes each of the partitioned data blocks and an error correction encoder, and a modulator which converts the coded data to a signal suitable for transmission on a transmission line used; and a receiver section having a demodulator which receives and converts the modulated signal to provide a digital signal, an error correction decoder which detects an error, if any, in the digital signal demodulated by the demodulator, and a source image decoder which decodes an error-free image data as it is, the receiver section further having an image data interpolator which interpolates, if an error has been detected by the error correction decoder, a data block in which the error is included or other data block to which the error has been propagated, with a substitution data.

These and other objects and advantages will be better understood from the ensuing description, made by way of example, of the embodiment of the image data transmission system according to the present invention with reference to the drawings.

BRIEF DESCRIPTION OF THE DRAWINGS

FIG. 8 is an explanatory drawing of the error correction according to the present invention;

FIG. 17(A) shows the concept of the picture element distribution in an original image;

FIG. 17(B) shows the concept of the lost area in the reconstructed image data;

FIG. 21 shows the concept of the picture element distribution by the y-axial linear interpolation according to the present invention;

FIG. 25 is a flow chart of the data transmission in the conventional image data transmission system;

FIG. 26 is a flow chart of the data reception in the conventional image data transmission system;

DETAILED DESCRIPTION OF THE PREFERRED EMBODIMENT

The preferred embodiment of the present invention will be described herebelow with reference to the accompanying drawings.

Figure 1:
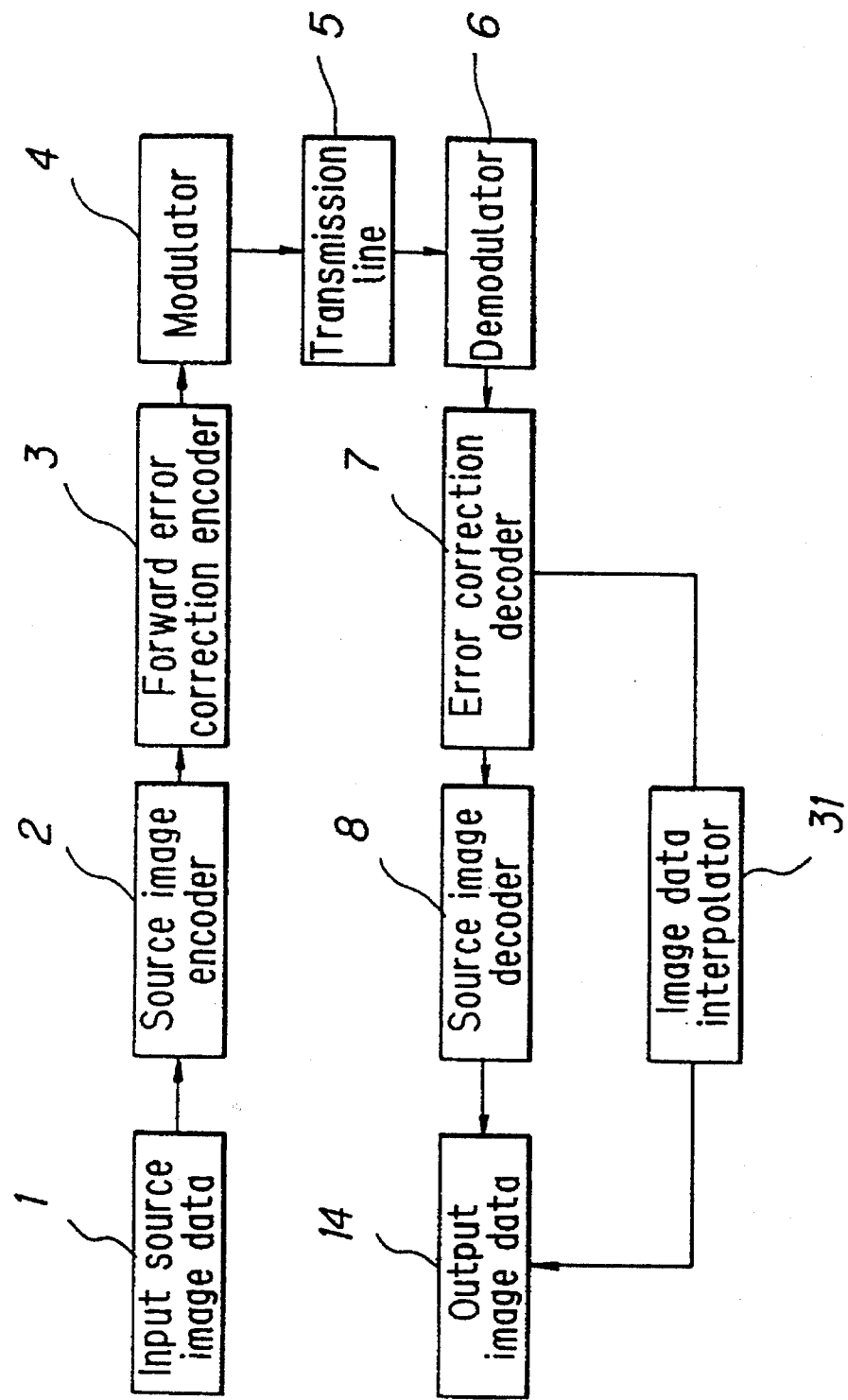
FIG. 1 is a schematic block diagram of the basic configuration of the present invention.
Figure 24:
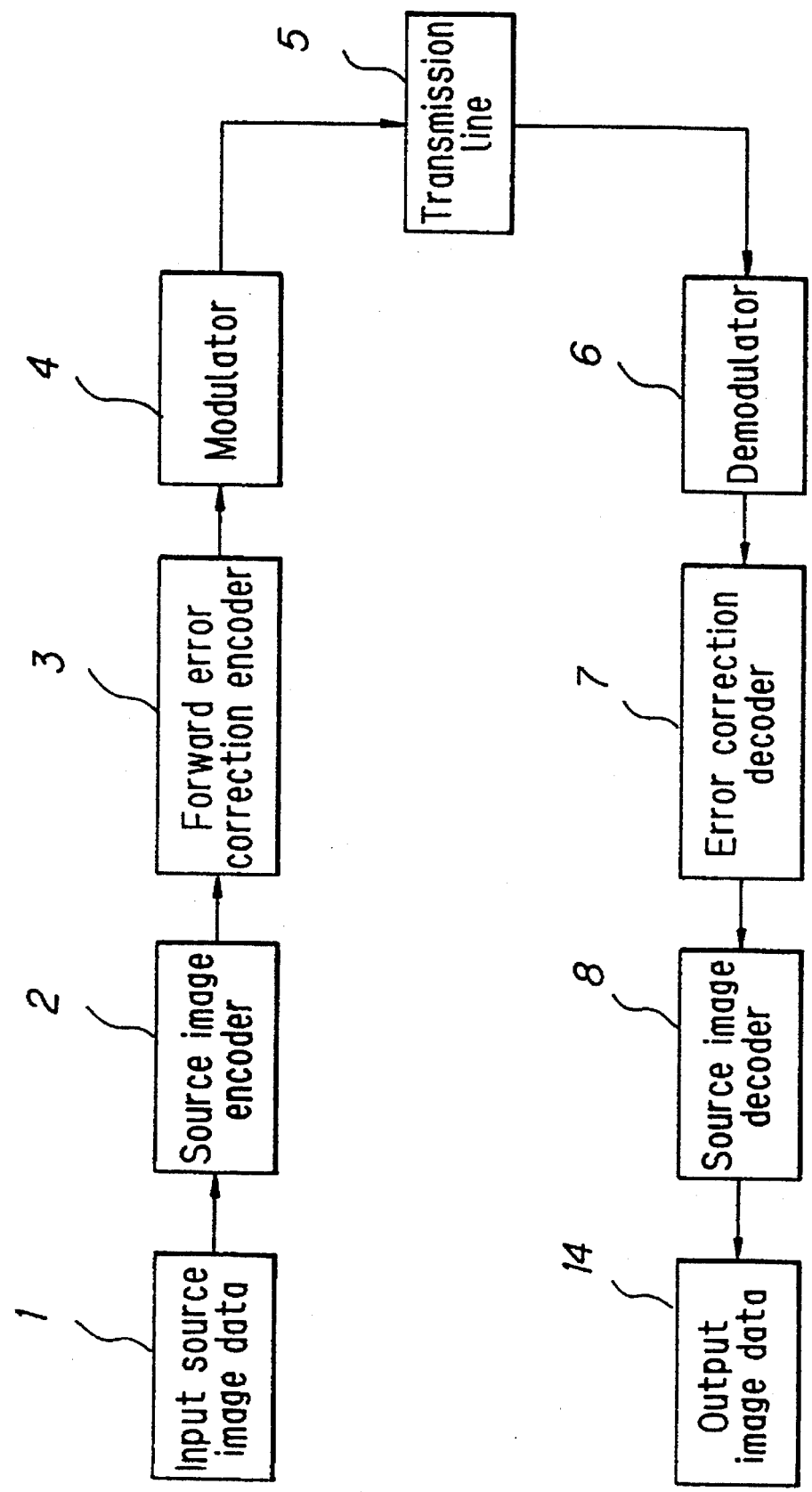
FIG. 24 is a schematic block diagram of the system configuration of the conventional image data transmission system.
Figure 27A:
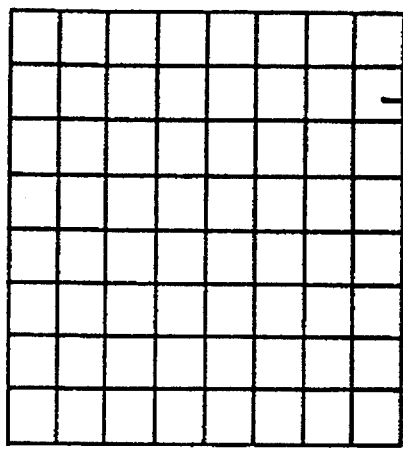
FIG. 27(A) shows an original image in the conventional image data transmission system.
Figure 27B:
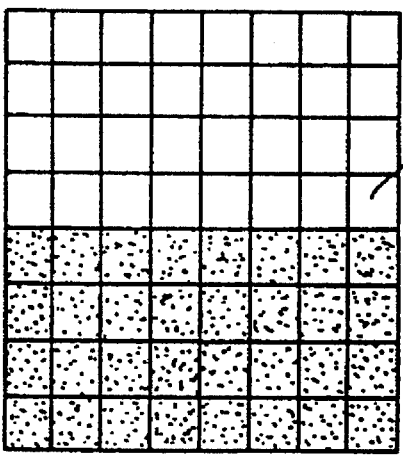
FIG. 27(B) shows a reconstructed image data in the conventional image data transmission system.
Figure 28A:
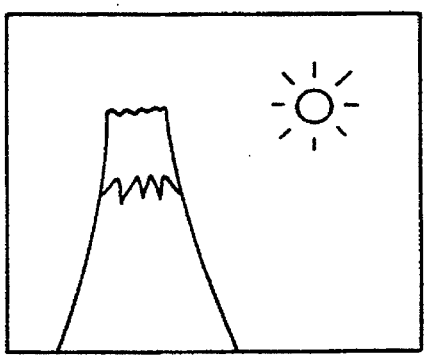
FIG. 28(A) shows a possible concrete original image in the conventional image data transmission system.
Figure 28B:
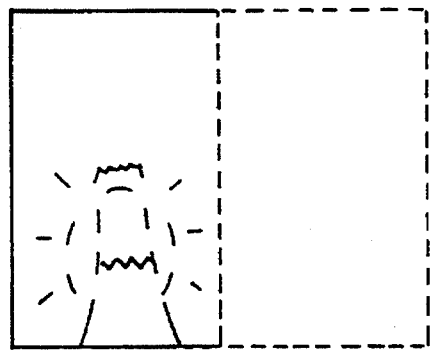
FIG. 28(B) shows a possible concrete reconstructed image data in the conventional image data transmission system.

FIG. 1 is a schematic block diagram showing the basic configuration of the image data transmission system according to the present invention. The transmitter section of the transmission system is shown in the upper portion of the Figure while the receiver section is shown in the lower portion. In Figures, the numerals 1 through 8 refer to the same component units as those in FIGS. 24 showing the conventional image data transmission system. Namely, the image data transmission system according to the present invention is also composed basically of a transmitter section comprising a source image encoder 2, forward error correction encoder 3 and a modulator 4; a transmission line 5; and a receiver section comprising a demodulator 6, error correction decoder 7 and a source image decoder 8.

At the transmitter section, an input image data 1 converted to a digital signal is encoded by the source image encoder 2, the coded signal is subjected to a forward error correction encoding (FEC) in the forward error correction encoder 3, and the FEC coded signal is modulated by the modulator 4 into a signal suitable for transmission over the transmission line 5 to the receiver section.

At the receiver section, the image data received over the transmission line 5 is demodulated by the demodulator 6 to provide a digital signal, the digital signal is checked by the error correction decoder 7 for detection of any error based on the forward error correction coding (FEC), and an error-free data is decoded to the source image by the source image decoder 8 to provide an image data 14 which is to be delivered as output for image data reconstruction.

If an error is detected in any area of a received data, the data area containing the error is discarded. The rest of the data is taken as an incomplete one and interpolated by the image data interpolator 31 based on the self-correcting type FEC (forward error correction) system. That is, the incomplete data is interpolated with a data previously stored in a memory or the like at the receiver section, whereby an approximate data for the incomplete area of the received image is provided. It should be noted that the above-mentioned image data is transmitted with an entire original image partitioned into blocks, for example, in 8×8 picture elements and that a received image data will be lost in any of such data blocks at a short break of the transmission line 5.

Figure 2:
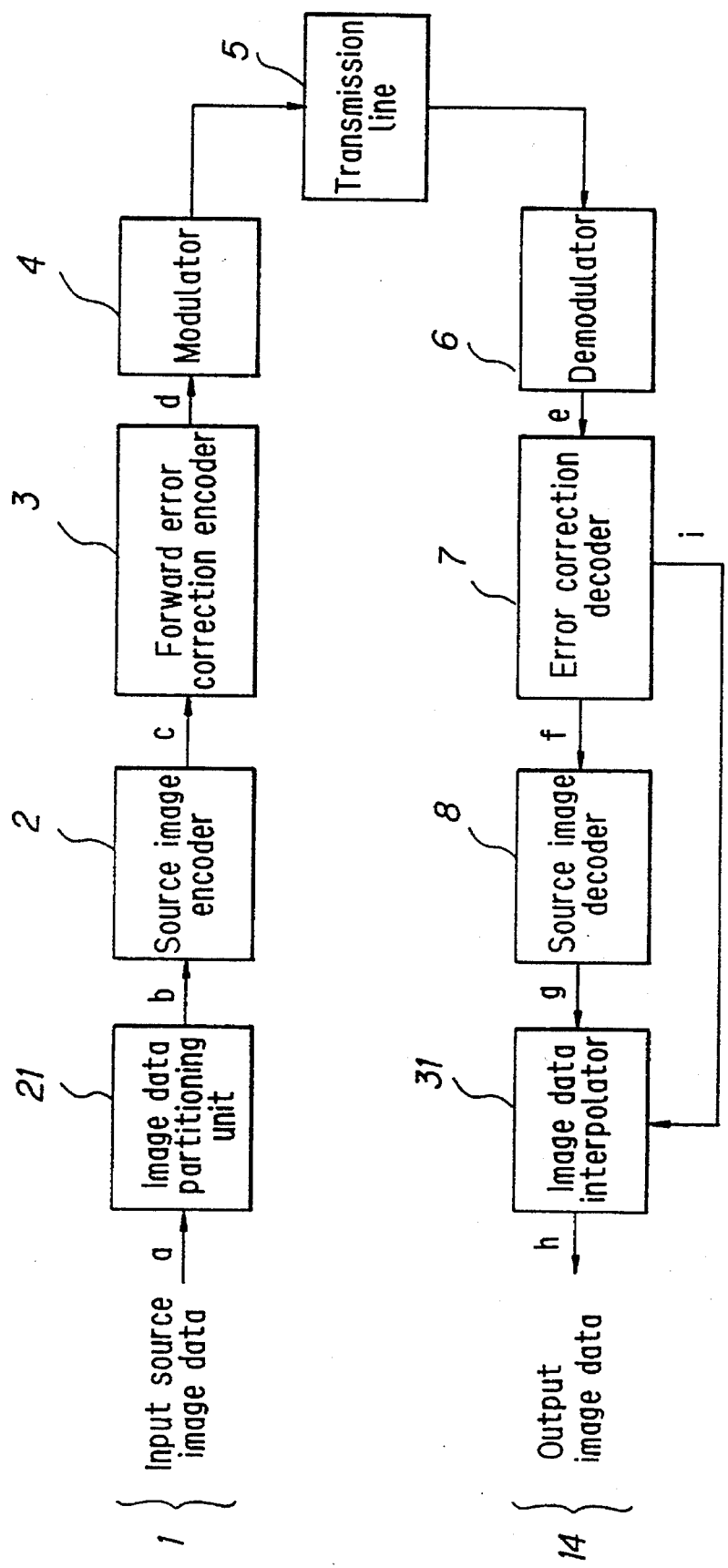
FIG. 2 is a block diagram showing an improved embodiment of the present invention in FIG. 1.

FIG. 2 shows an improved embodiment of the present invention in FIG. 1, which further comprises an image data partitioning unit 21 and image data interpolator 31 provided additionally in the basic configuration.

Figure 3:
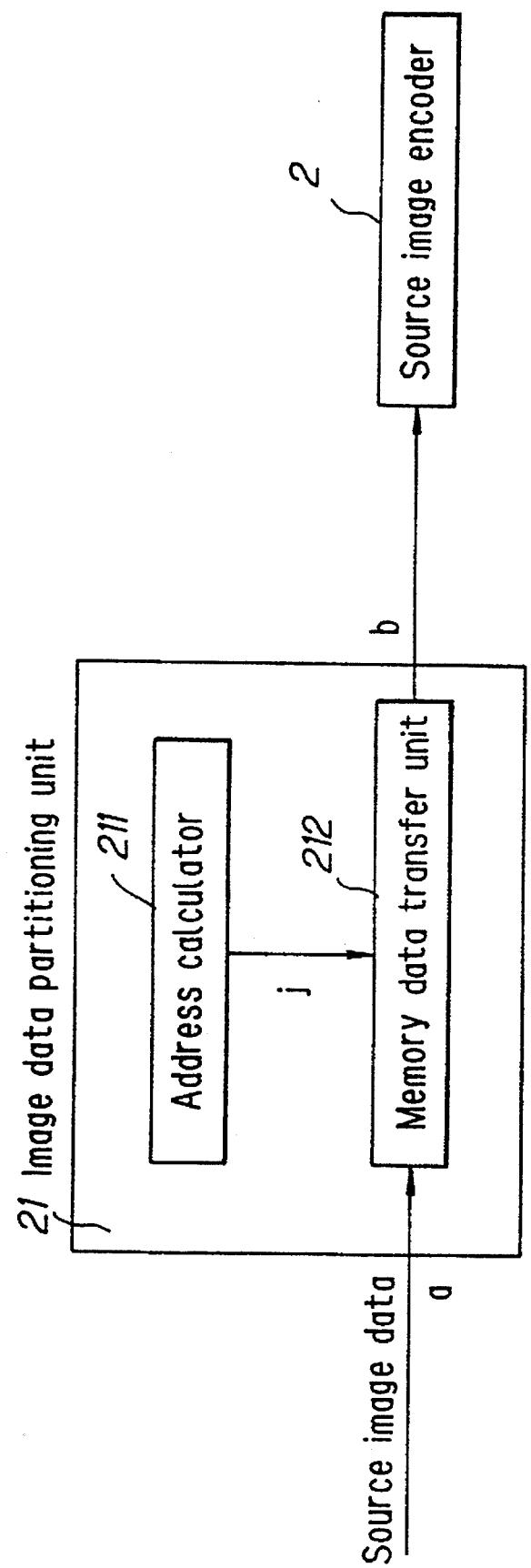
FIG. 3 gives a detail of the image data partitioning unit in the improved embodiment of the present invention in FIG. 2.

FIG. 3 shows in detail the image data partitioning unit 21 consisting of an address calculator 211 and a memory transfer unit 212. The address calculator 211 calculates an address $i$ of an image data in a position corresponding to a rectangular block to be coded, which will be signaled to the memory transfer unit 212. The memory transfer unit 212 is supplied with an image data $a$ based on the address $i$ and transfers an image data $b$ to the source image encoder 2.

Figure 4:
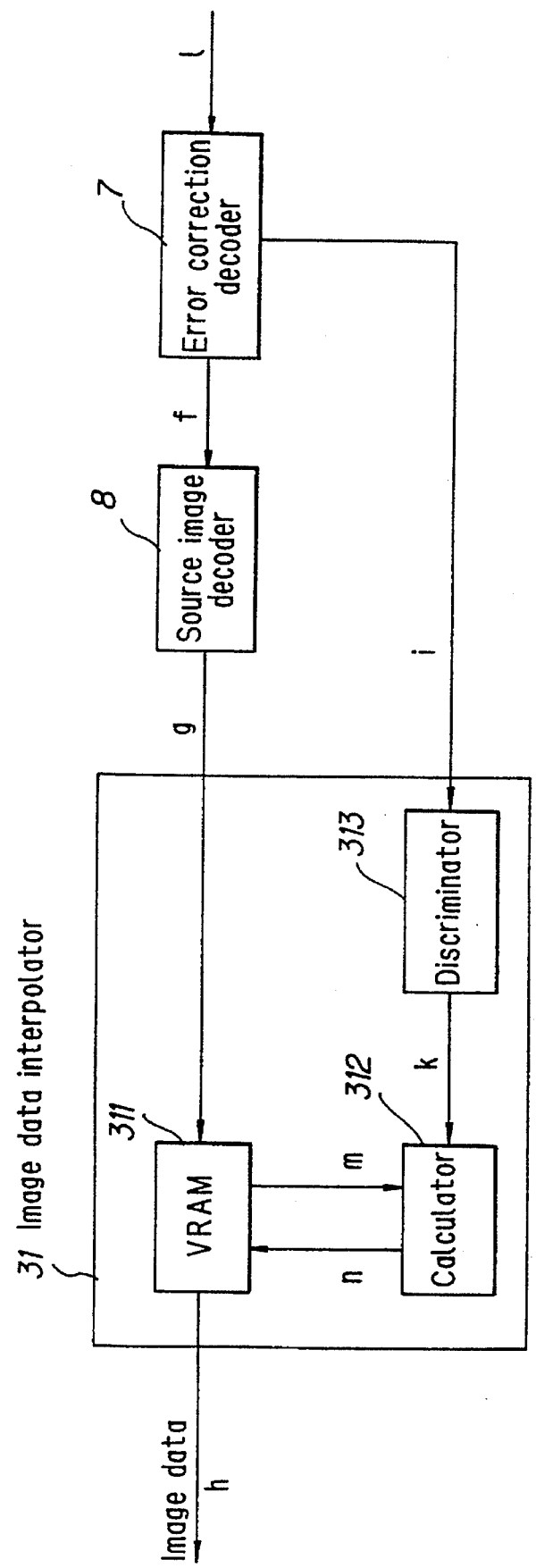
FIG. 4 shows a detail of the image data interpolator in the improved embodiment of the present invention in FIG. 2.

FIG. 4 shows in detail the image data interpolator 31 consisting of a VRAM 311, calculator 312 and discriminator 313. A received signal $e$ demodulated by the demodulator 6 is checked for any error therein by the error correction decoder 7 where the data is corrected for the error. The data thus error-corrected is passed to the source image decoder 8. If an error is detected in the received signal $e$, an error signal $i$ indicative of the position of a block which contains the error is sent to the discriminator 313. The discriminator 313 calculates the position of the block containing the error based on the error signal $i$ and an address $k$ in the VRAM 311, corresponding to the position of a reference block adjacent to the error block, and sends them to the calculator 312. The calculator 312 reads an image data $m$ from the VRAM 311 based on the received VRAM address $k$. The calculator 312 interpolates it and then writes a data $n$ into the VRAM 311 again.

At the transmitter section shown in FIG. 2, an input source image data is partitioned into 8×8 picture elements by the image data partitioning unit 21 and each of the partitioned image data is coded by the source image encoder 2 and forward error correction encoder 3. It is one of the characteristics of the present invention that the input source image data subject to the source image encoding is identical in size to that subject to the forward error correction encoding. The coded data $\underline{d}$ is converted by the demodulator 4 to a signal suitable for transmission over the transmission line 5.

At the receiver section, the digital signal e is delivered by the demodulator 6 and checked for any error therein by the error correction decoder 7. A error-free data is decoded as it is by the source image decoder 8. However, a data $\underline{i}$ having an error in any of the blocks therein, or a data $\underline{i}$ having any of the blocks thereof to which an error has been propagated, is corrected by the image data interpolator 31 to deliver an output image data 14.

Figure 5:
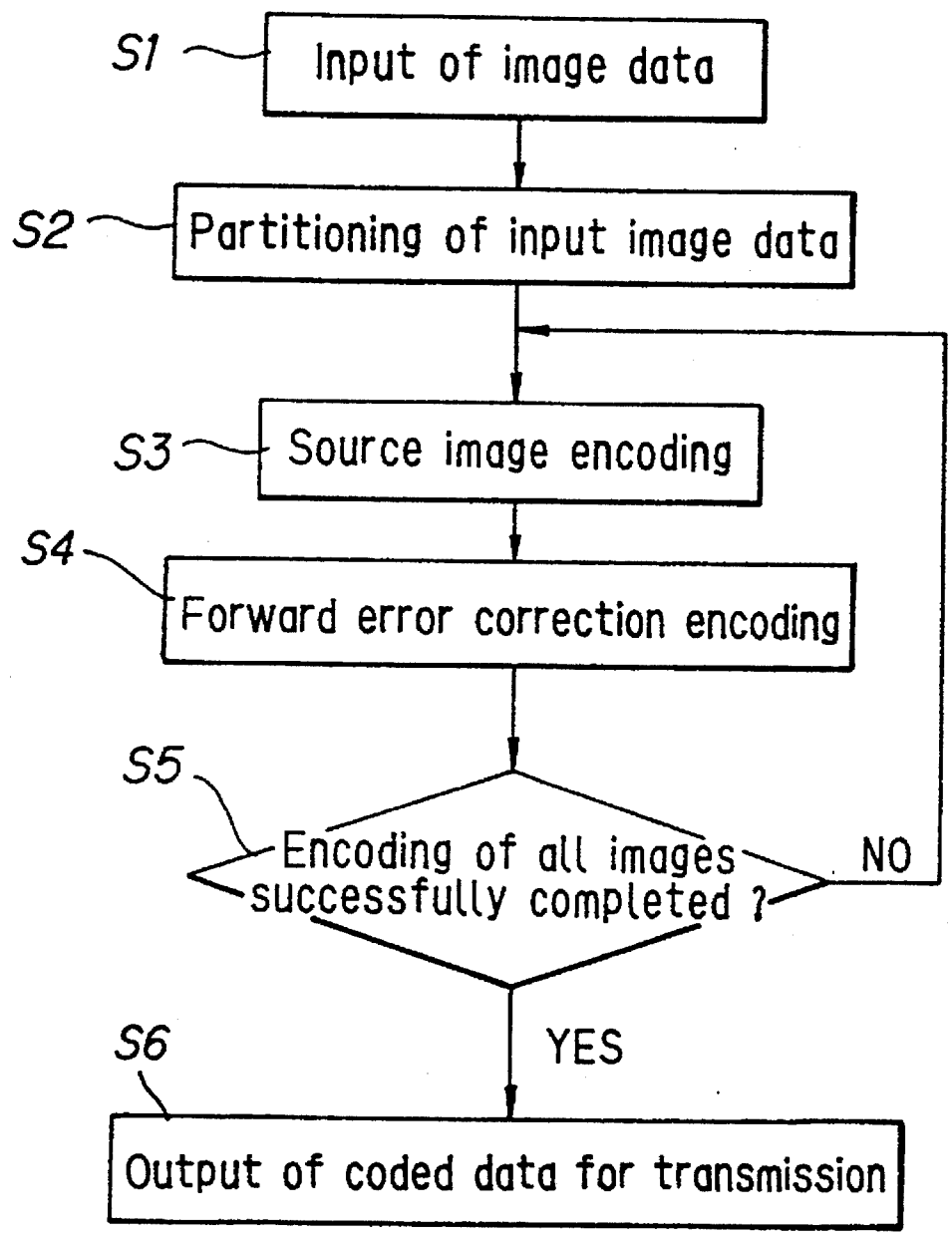
FIG. 5 is a functional flow chart of the transmitter section (in FIG. 2) of the present invention.
Figure 6:
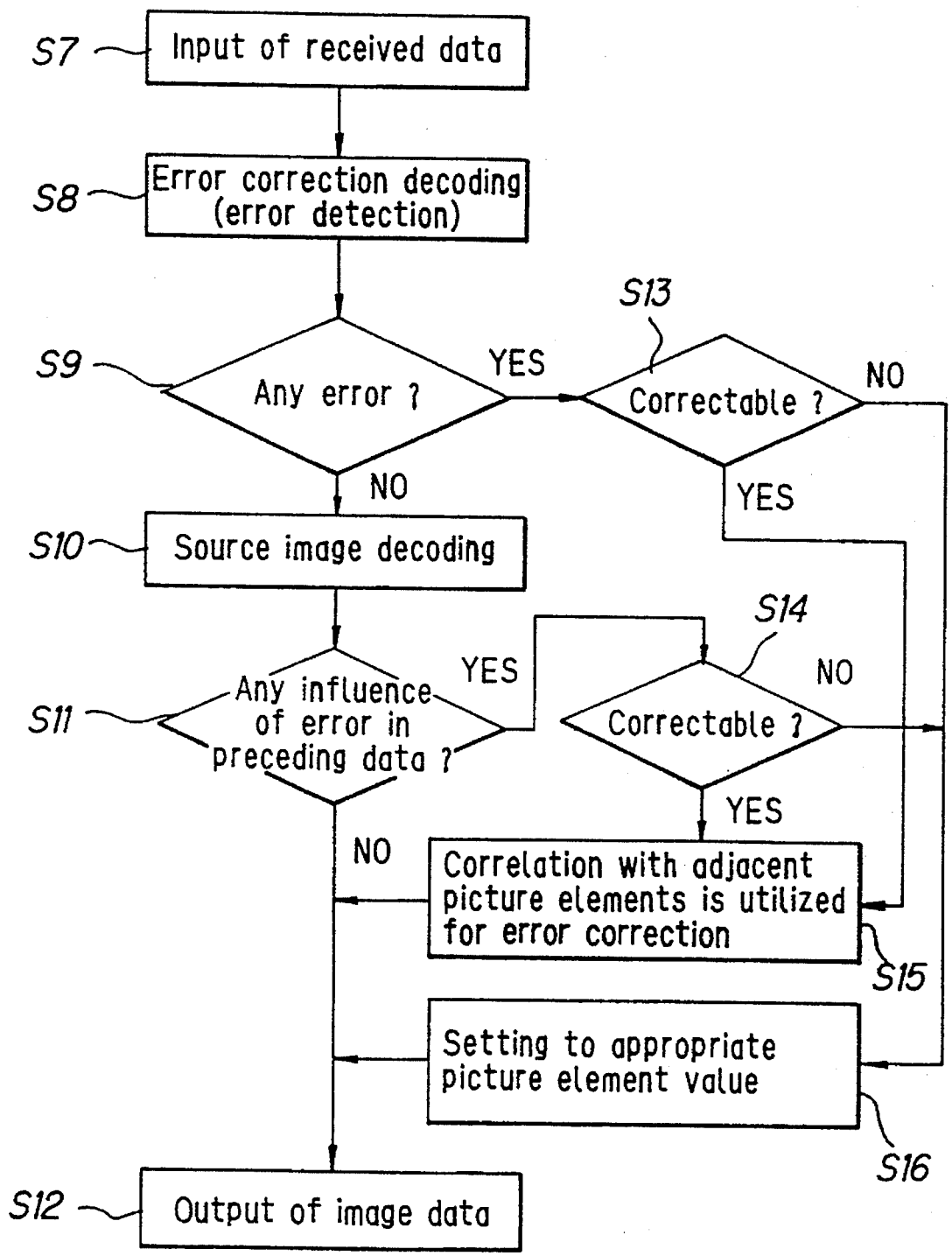
FIG. 6 is a functional flow chart of the receiver section (in FIG. 2) of the present invention.

FIGS. 5 and 6 are functional flow charts of the present invention, of the transmitter and receiver sections, respectively.

At the transmitter section, an input image data is partitioned into blocks (in the step S2), is subject to the source image encoding (in the step S3) and then to the forward error correction encoding (in the step S4). When all the blocks of the image are coded (in the step S5), the data is delivered for transmission (in the step S6). At the receiver section, an image block containing an error (in the step S9) having been caused during transmission or a propagated error (in the step S11), detected only by the error correction encoding (in the step S8), is corrected by utilizing the inter-image correlation (in the step S15). If the error correction is impossible, the data is set to an appropriate picture element value (in the step S16).

Figure 7A:
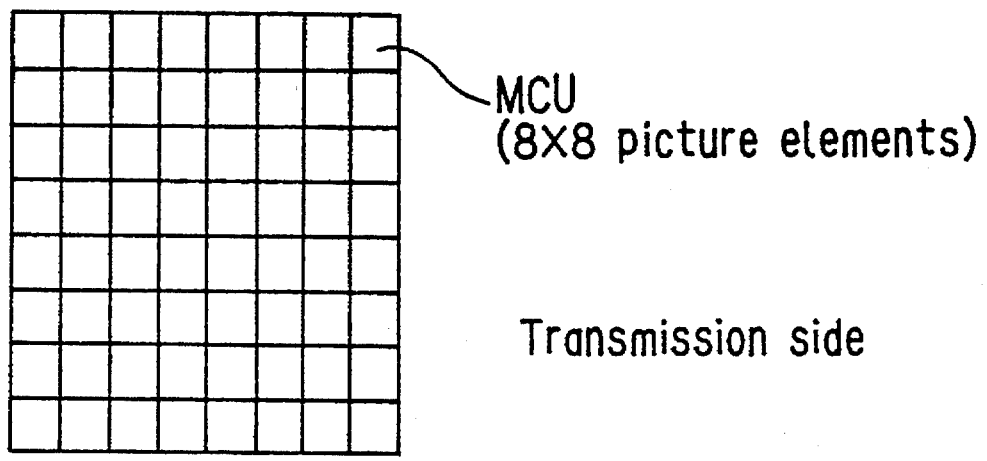
FIG. 7(A) shows an example of original image at the transmitter section.
Figure 7B:
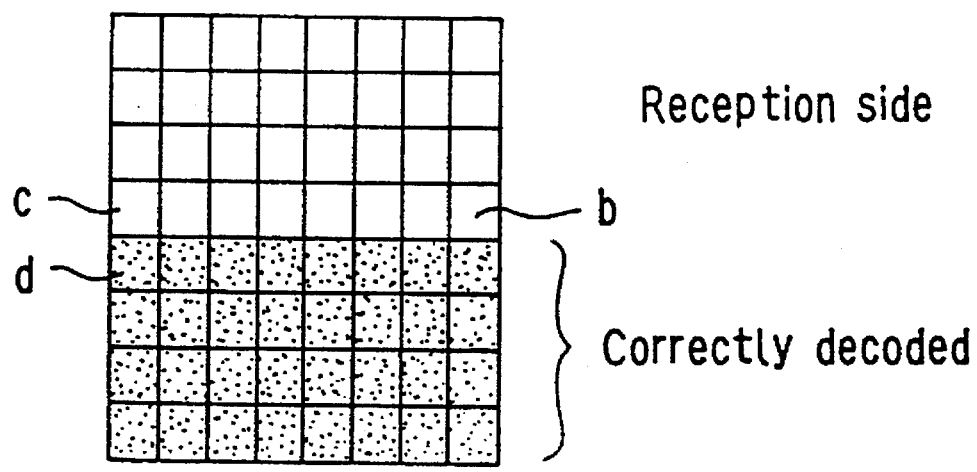
FIG. 7(B) shows an example of reconstructed image data at the receiver section (both when the present invention is applied to the image data transmission)

FIGS. 7(A) and 7(B) show the conceptual image examples when the present invention is applied to the image data transmission system recommended by the JPEG. FIG. 7(A) shows an original image at the transmitter section and FIG. 7(B) shows a reconstructed image data at the receiver section. According to the present invention, a source image is partitioned into picture elements (MCU) which can be decoded to the source image, one or more of the picture elements is selected, subjected to a forward error correction encoding and then transmitted.

At the receiver section, a data containing an error, if any detected therein, is discarded. A data containing no error is subject to Huffman encoding without fail. In FIG. 7(B), it is assumed that MCU $\underline{b}$ has not correctly been received. In the JPEG system, since the DC coefficient of the spectrum is differentially coded, an error will be propagated to a next image data if it is left as it is. For correct decoding of subsequent DC coefficients, the correlation between the previously received MCU $\underline{c}$ and MCU $\underline{d}$ is utilized to estimate a DC coefficient with which the picture element value varies smoothly at the boundary between MCU $\underline{c}$ and MCU $\underline{d}$, thereby correcting subsequent picture element values.

As references for the smooth variation of the picture element, there are available various methods such as an estimation for continuous differential coefficient, use of a suitable approximate correlation, etc.

The error correction using the above-mentioned approximate correlation will be described in further detail herebelow. First, it is assumed that the upper portion of an image that has been correctly received and decoded is $MCU_{ok}$ while the lower portion containing an error (has been detected in a preceding block and the DC coefficient has been lost) is $MCU_{ng}$. Normally, an entire data coefficients are AC+DC. However, since the DC coefficient has been lost, the picture elements are shifted x(DC coefficient) in total.

For the picture element values to be smoothly continuous in the b-th and c-th lines in FIG. 8, the picture element value in MCU containing the error should be correct. Assume here that the necessary amount of correction is $\underline{x}$. A picture element for the $\underline{x}$ is added to the picture elements. The $\underline{x}$ is calculated from the equations (1) and (2) below for a selected column of the MCU.

$$c_i+x=\{(d_i+x)+b_i\}/2, \text{ namely, } x=d_i+d_i2c_i (\text{where}=0, 1, 2, \ldots) \quad (1)$$

or $$b_i=\{a_i+(c_i+x)\}/2, \text{ namely, } x=a_i+c_i-2b_i (\text{where } i=0, 1, 2, \ldots) \quad (2)$$

In this way, the correction amount x can be determined. The x is a value of the error. For example, the difference $(a_2-b_2)$ between the picture element value $a_2$ in the second column on the line $\underline{a}$ and the picture element $b_2$ in the 5th column on the line $\underline{b}$, the difference $(c_5-d_5)$ between the picture element value $c_5$ in the 5th column on the line $\underline{c}$ and the picture element value d5 in the 5th column on the line $\underline{d}$ or the mean value among $a_2$, $b_2$, $C_2$ and $d_2$ may be used as a typical correction amount.

In short, there is a little difference between the value $\underline{x}$ derived from each value $\underline{i}$ and the value $\underline{x}$ determined from the equation (1) or (2). However, the mean value or one typical value may be used without any problem.

Thus, no error will be propagated to any subsequent data, whereby a natural received image close to the original image can be reconstructed. For a higher precision of the image reconstruction, the error correction has to be done for the picture element values to vary smoothly along the borders of all MCUs.

Figure 9:
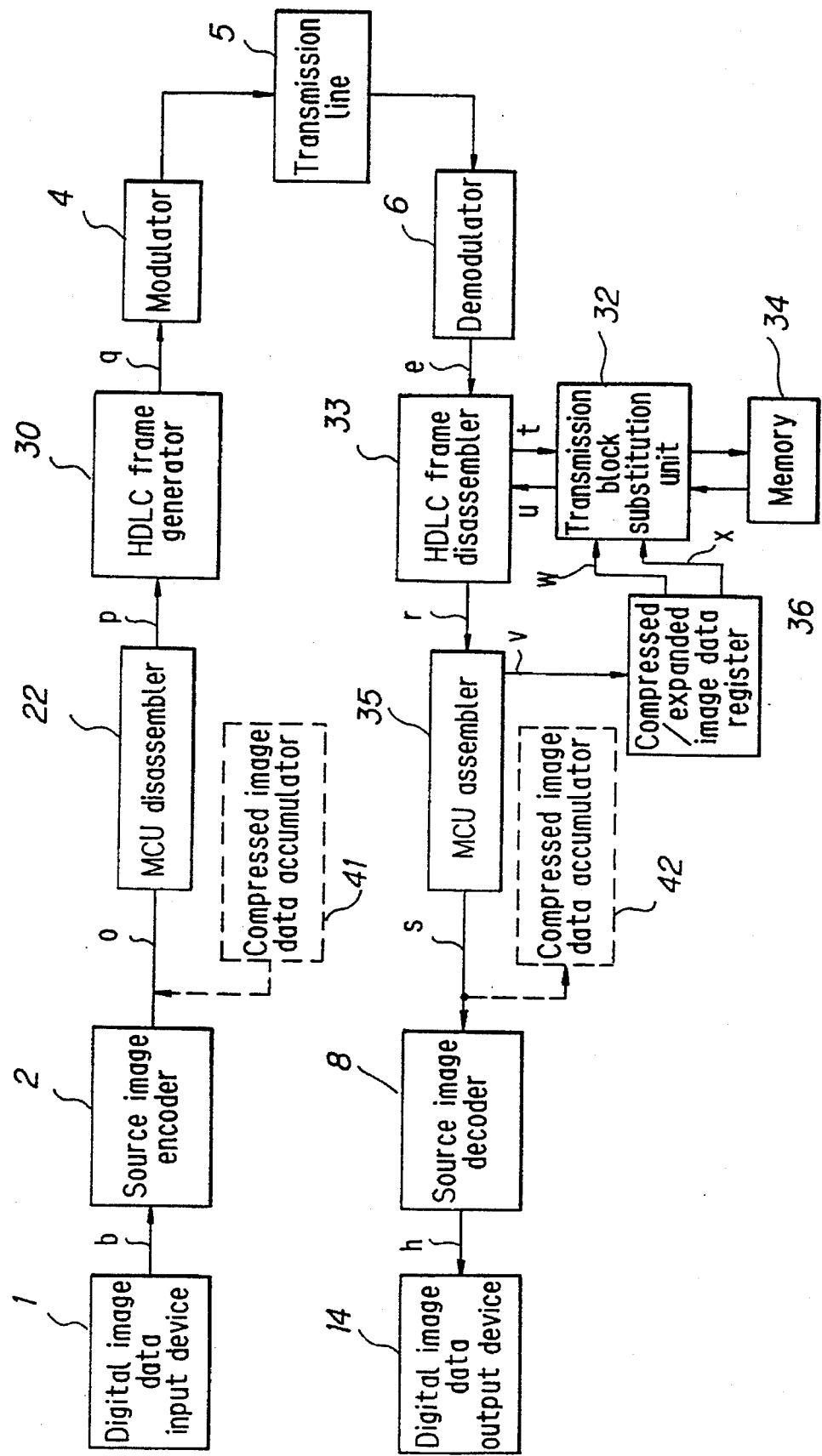
FIG. 9 is a block diagram showing in further detail the configuration of the present invention shown in FIG. 2.

FIG. 9 is a block diagram showing in further detail the configuration of the improved embodiment shown in FIG. 2. In Figure, the input image data 1 is supplied to the source image encoder 2. In the source image encoder 2, digital image data $\underline{h}$ is subjected to a DCT (discrete cosine transform), vector quantization and Huffman encoding to provide a compressed data $\underline{o}$ which is passed to the MCU separator 22 which will separate it into individual MCU signals $\underline{p}$. This MCU separation may be done in parallel with the source image encoding.

The MCU signals p are supplied to the HDLC (high level data link control) frame generator 30 which groups one or more of the MCU signals $\underline{p}$ into one transmission block, assigns an error correction sign or the like to each of such transmission blocks to generate HDLC frames in a predetermined frame sequence and delivers an HDLC frame signal $\underline{q}$.

Figure 11:
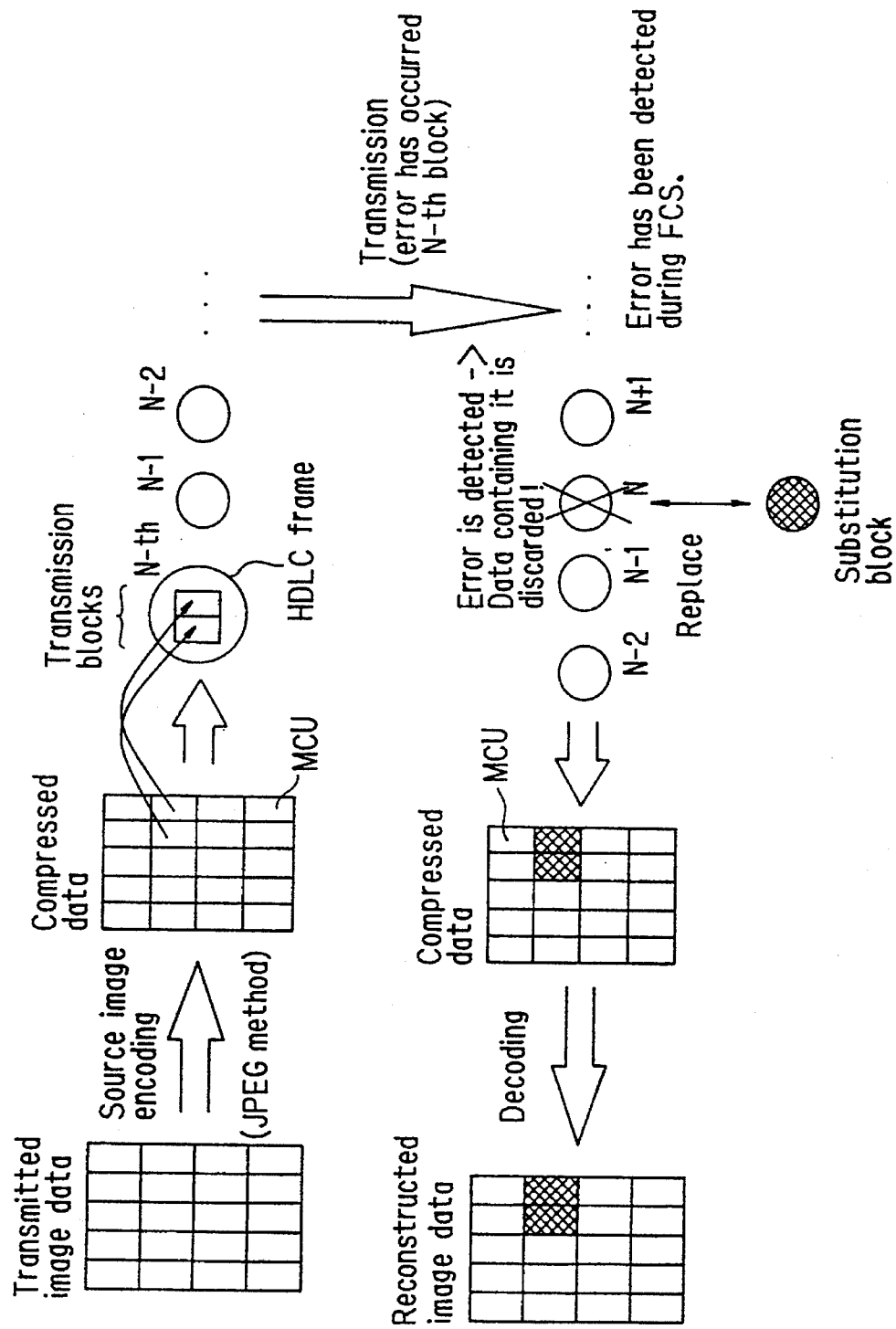
FIG. 11 is an explanatory drawing showing the operation of the present invention.

FIG. 11 explains the operation of the embodiment of the present invention shown in FIG. 2. This is an example of a transmission of image data compressed based by the JPEG-recommended method by utilizing only the frame configuration of the HDLC.

At the transmitter section, the image data is subject to a source image encoding by the JPEG-recommended method and picture elements (MCU) are coded into a compressed data. One or more (two in FIG. 3) of such MCUs is taken as one transmission block. The transmission blocks thus obtained are transmitted in each HDLC frame. The signal is transmitted from the modulator 4 to the demodulator 6 over the transmission line 5.

The output signal $\underline{e}$ from the demodulator 6 is supplied to the HDLC frame disassembler 33 in which the signal $\underline{e}$ having been received and demodulated in FCS (frame check sequence) is partitioned into HDLC frames and each frame is checked for any error based on the error correction data thereof. If no error is detected, the transmission block in the HDLC frame is disassembled into individual MCUs and delivered. If an error is detected in any HDLC frame (N-th frame), data in the transmission block in that frame is discarded and a signal i indicative of the error is delivered. The signal i is replaced with a data u in the substitution block which is supplied from the transmission block substitution unit 32 and disassembled into individual MCUs and delivered. The reference numeral 34 indicates an memory in which data in the substitution block is to be stored beforehand. The transmission block substitution unit 33 will be described in further detail later.

A general method for error detection will be discussed herebelow.

A method for detecting an error in the HDLC procedure, one of the data communication standards, can be used for the error correction. This method is called CRC (cyclic redundancy check). In this method, a data is divided by a predetermined number and a remainder derived from the division is used for error check. Namely, a received data row Y(x) is regarded as a high-degree polynominal and divided by using a generated polynominal $G(x)=x^{16}+x^{12}+x^5+1$ based on the recommendations of CCITT (Comité Consultatif International Telegraphique et Telephonique). The remainder S(x) resulted from the division is transmitted as suffixed to the data.

Figure 12:
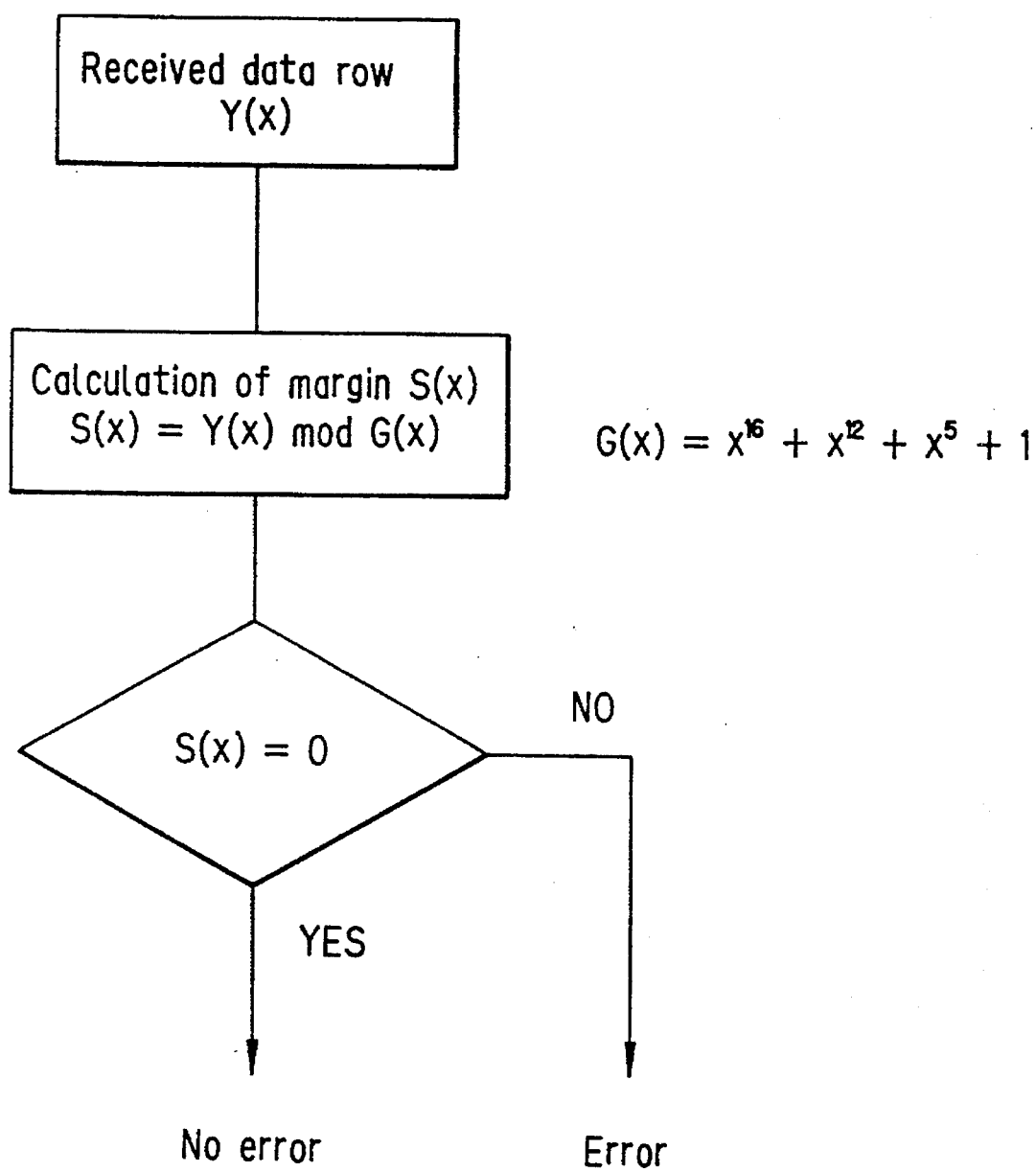
FIG. 12 is a flow chart of the general error-detecting procedure.

At the receiver section, data is divided by using the same polynominal. When no remainder results, the data is judged to have no error. This is shown in the form of a schematic flow chart in FIG. 12.

The operations at the receiver section will be described below with reference to FIG. 11. A selected one of images in transmission blocks (one having nothing to do with any image to be transmitted, for example, monochromatic image) or one or more images generated at the time of reception is stored as substitution block in the memory beforehand. The received signal is checked in FCS of the HDLC frames. The transmission block of a frame (N-th frame) in which an error has been detected is discarded and replaced with the substitution block stored in the memory. It is disassembled into MCUs.

A compressed data is thus reconstructed and decoded into MCUs to reconstruct the source image data. More particularly, even if a transmission error has taken place in any one of the frames, the transmission block of the error frame is replaced with the substitution block to reconstruct the image data without no send request. Since an image is represented with an assembly of multiple picture elements, it can serve as an image data even if it is partially indefinite in case its importance is low. Only when it is judged from viewing a reconstructed image data that its importance is high, a send request has to be made to the transmitter section.

The MCU composer 35 reconstructs and delivers a compressed data s from individual signals r supplied from the HDLC frame disassembler 33. The data reconstruction by the MCU 35 may be done in parallel to the decoding by the source image decoder 8. The compressed data s delivered from the MCU composer 35 is decoded by the source image decoder 8 and digital image output unit 14 to provide a reconstructed image data.

The compressed/expanded image data register 36 extracts and temporarily holds an error-free compressed/expanded data and image data of a preceding frame from the MCU composer 35 to supply the transmission block substitution unit 32 with the compressed/expanded data w and image data x as necessary.

As shown in FIG. 9, the transmitter section has a compressed image data accumulator 41 and the receiver section has a compressed image data accumulator 42. Both the accumulators 41 and 42 are shown each in a dashed line block. At the transmitter section, the compressed image data accumulator 41 serves as a data source in place of the source image encoder 2 to accumulate a compressed image data beforehand as a compressed data b to be transmitted. At the receiver section, the compressed image data accumulator 42 accumulates a compressed data s received over the transmission line 5 and delivered from the MCU composer 35 before the data is supplied to the source image decoder 8.

Next, the image data interpolator 31, one of the essential elements of this embodiment of the present invention, will be described below. More particularly, the transmission block substitution unit 32 and its associated devices will be described in detail.

Figure 10:
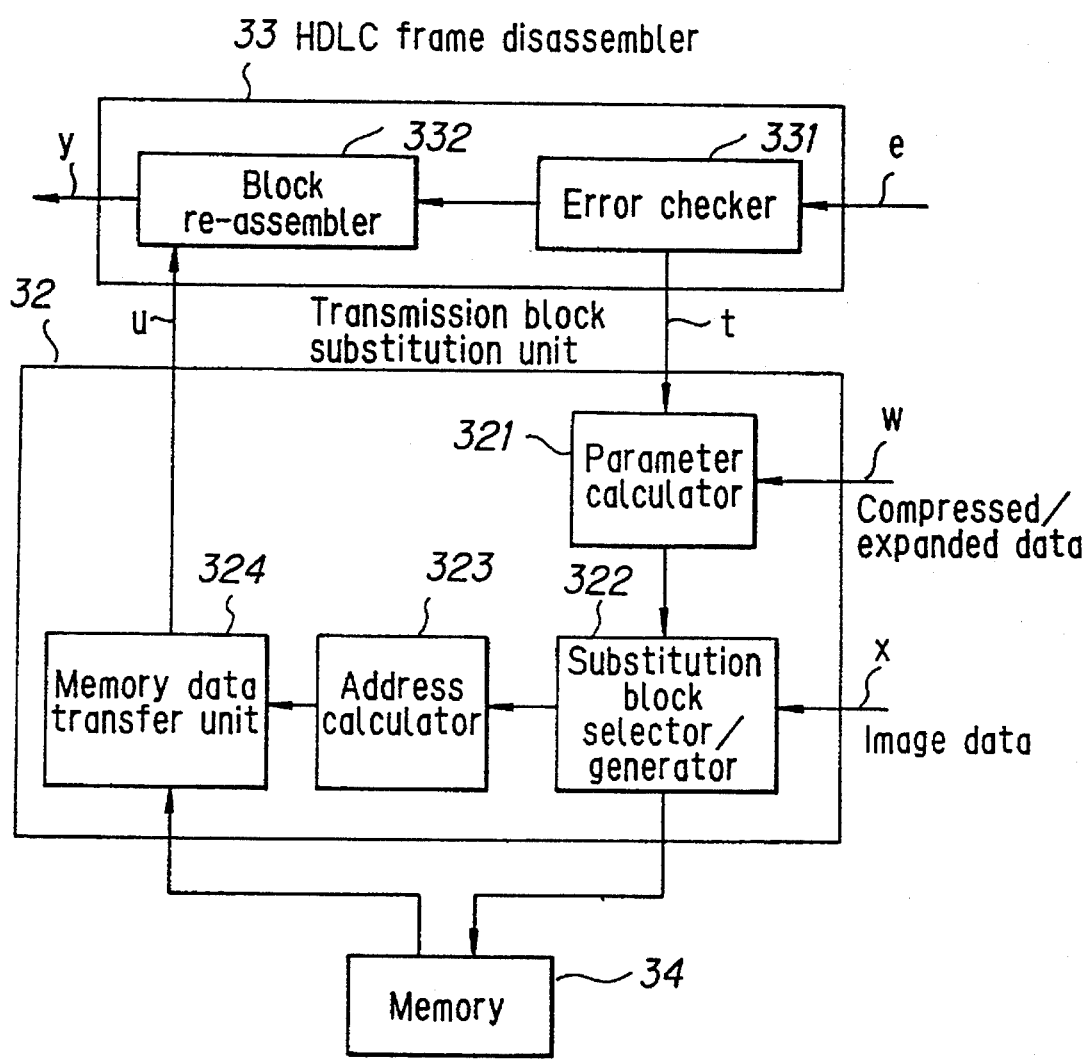
FIG. 10 is a block diagram showing in detail the HDLC frame disassembler and transmission block substitution unit of the present invention.

FIG. 10 is a block diagram showing the detail of the essential elements of the embodiment shown in FIG. 9. As shown, the HDLC frame disassembler 33 comprises an error checker 331 and counter-blocking unit 332. The transmission block substitution unit 32 comprises a parameter calculator 321, substitution block selector/generator 322, address calculator 323 and a memory data transfer unit 324. The operations of these elements are controlled by a central processing unit (CPU) or the like which controls the entire system. The system of the control over the entire image data transmission system will be discussed later.

The operation control will be briefly described below.

A received and demodulated signal e supplied to the HDLC disassembler 33 is checked by the error checker 331 in FCS for each frame. A frame signal with no transmission error is passed to the counter-blocking unit 332 where it will be disassembled into individual MCU signals r and delivered as output.

For a frame signal of which any error has been detected, an error signal t indicating that the frame has the error is provided to the parameter calculator 321. The parameter calculator 321 takes from the compressed/expanded image data register 36 a compressed/expanded data m indicative of thinning-out conditions for a preceding frame, calculates parameters of the frame in consideration and supplies them to the substitution block selector/generator 322.

Based on the given parameters, the substitution block selector/generator 322 selects one of the plurality of substitution blocks previously stored in the memory 34 that is suitable for the frame in consideration, and supplies the number for the substitution block to the address calculator 323.

The address calculator 323 calculates an address in the memory 34 that corresponds to a designed number, and supplies it to the memory data transfer unit 324. The memory data transfer unit 324 reads out of the memory 34 a data in a substitution block at the designated address, and transfers it to the counter-blocking unit 332 of the HDLC frame disassembler 33. The counter-blocking unit 332 replaces a substitution block from the memory data transfer unit 324 with the transmission block of a frame in which an error has been detected, decomposes it into individual MCUs and supplies them to the MCU composer 35.

The HDLC frame disassembler 33 adjusts the order, delay and so forth of the transmission block/substitution block.

The substitution block is stored into the memory 34 as in the following:

To store a selected image, for example, a monochromatic image as a substitution block, an image data x is selected, supplied to the substitution block selector/generator 322 where it is numbered as a substitution block, and stored into the memory 34 beforehand during a pause of reception.

To generate and store a substitution block during reception of image data, an image data x of a frame free of any error is taken from the compressed/expanded image data register 36 into the substitution block selector/generator 322 where a substitution block is generated and numbered, the block is written into the memory 34. In this way, one or more substitution block tables, numbered respectively, is stored into the memory 34.

Now the embodiment of the control over the entire image data transmission/reception system will be explained below.

Figure 13:
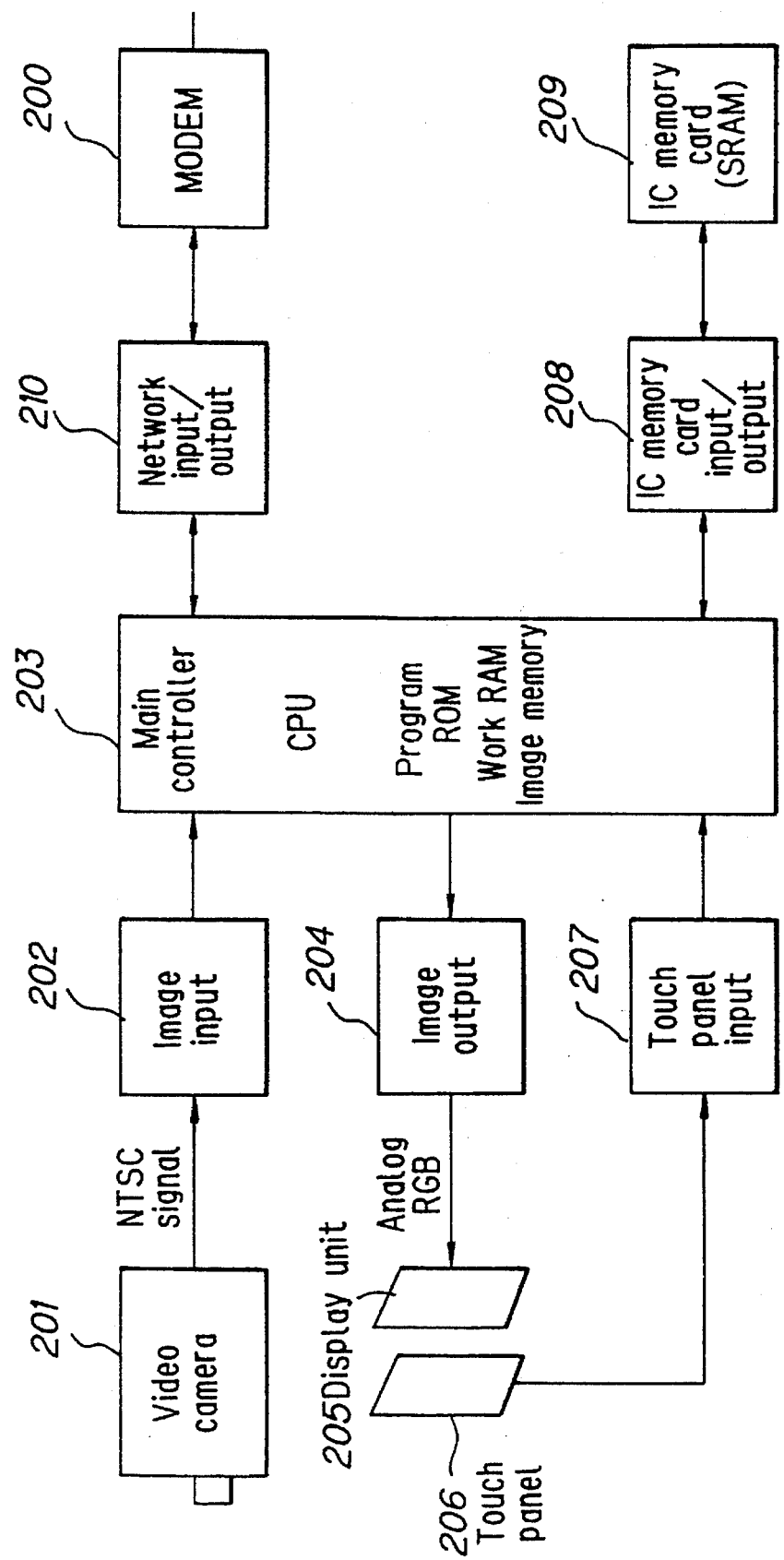
FIG. 13 is a block diagram showing the mode of control according to the present invention.

FIG. 13 is a block diagram showing one example of the mode of control over the image data transmission/reception system. In Figure, the image data transmission/reception system comprises a video camera 201, image input device 202 which digitizes the output signal from the video camera 201, main controller 203 consisting of an image memory which stores digitized image signals, program ROM, work RAM, CPU, etc. for compression of the signal signals, image output device 204 provided to input image data to a display signal such as RGB signal, etc., display unit 205 to display the output from the image output device 204, touch panel input device 207 receiving a signal from a touch panel 206 provided additionally to the display unit 205, memory card 209 with respect to which a compressed image data is saved and read out and its associated IC memory card 208, network input/output device 210 intended for transmission and reception of compressed data, MODEM 200, etc.

The image input device 202 includes all the elements of the transmitter section shown in FIGS. 1, 2 and 9, and the image output device 204 includes all the elements of the receiver section shown in FIGS. 1, 2 and 9.

Figure 14:
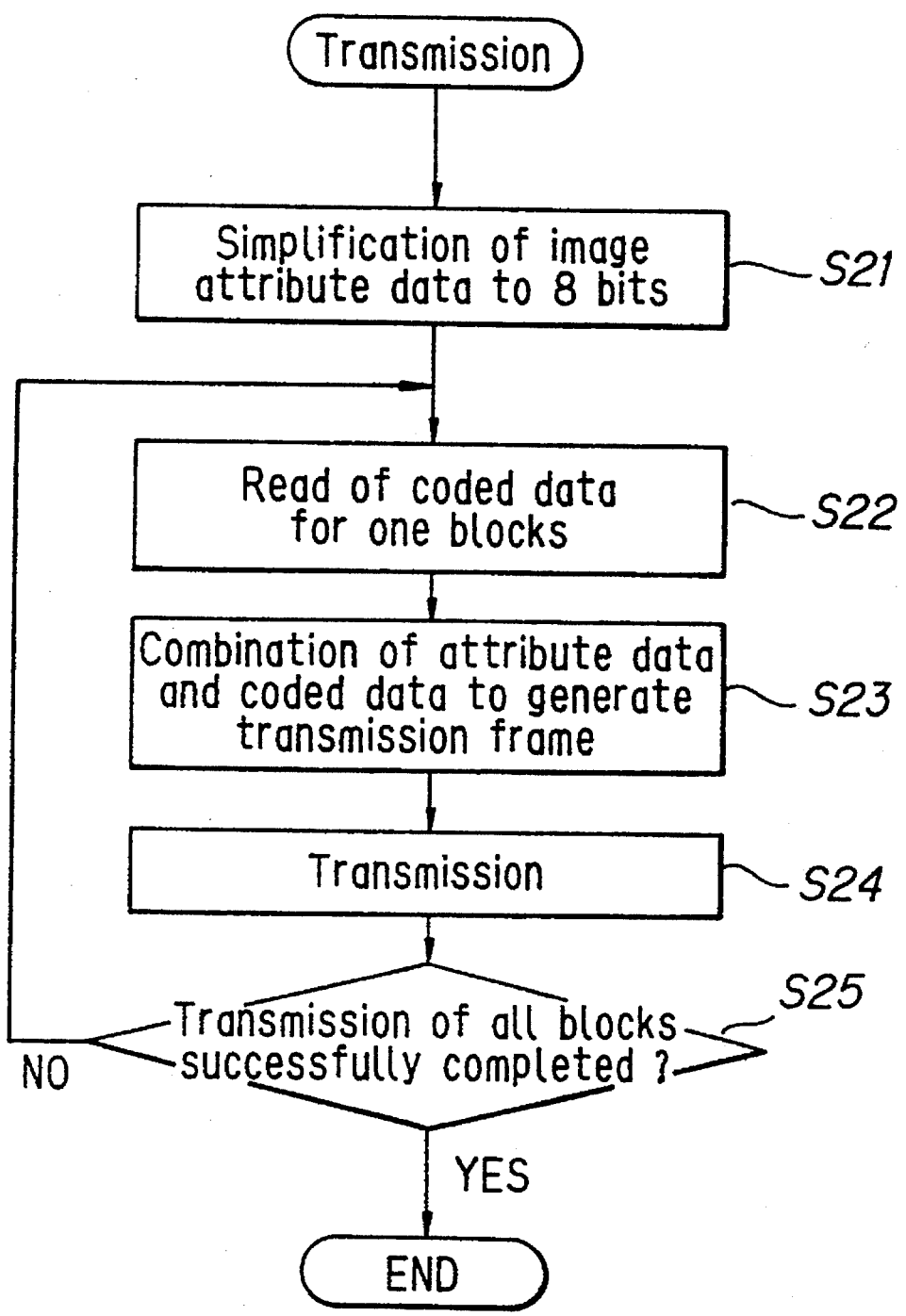
FIG. 14 is a flow chart of the data transmission control according to the present invention.
Figure 15:
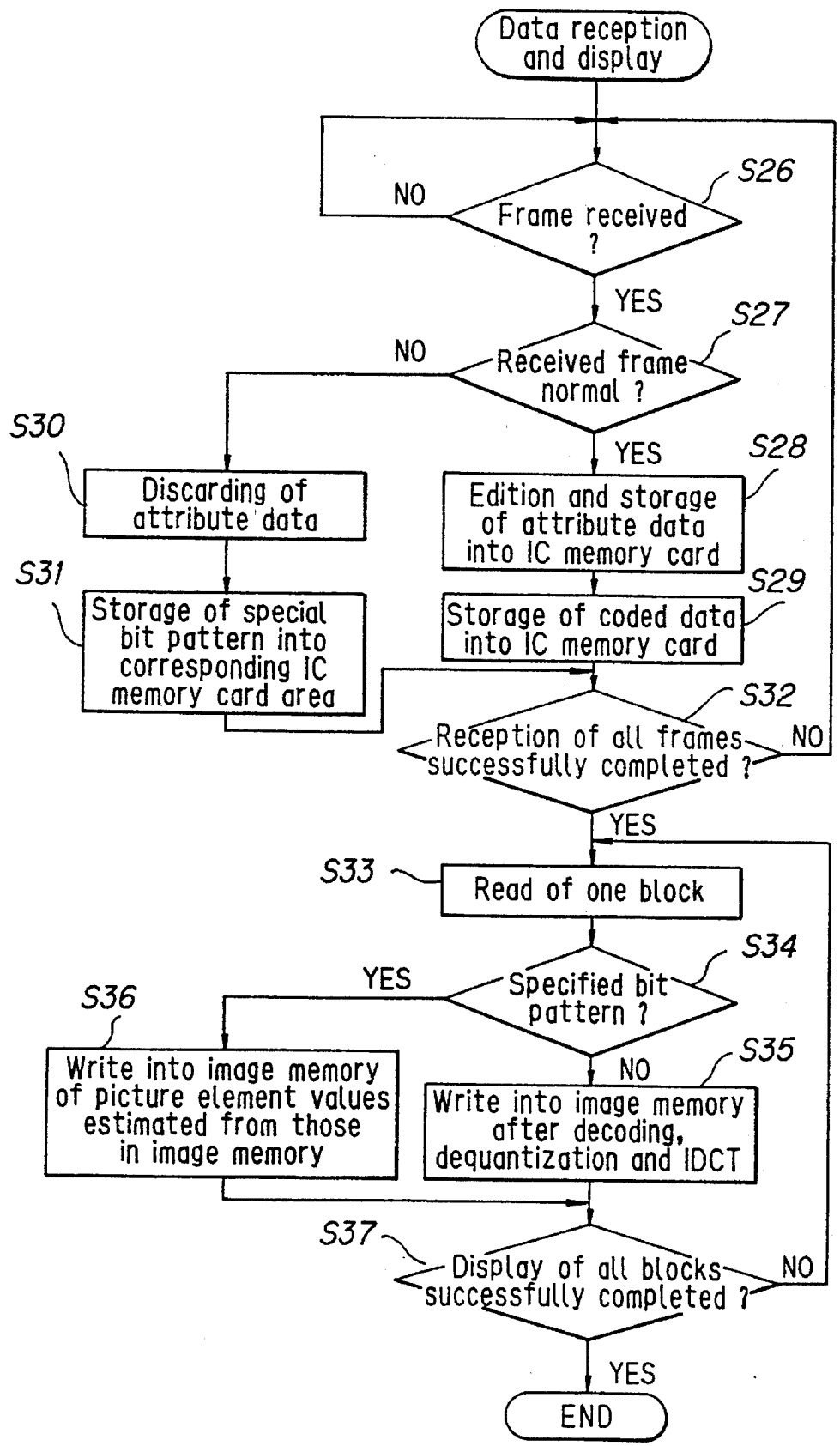
FIG. 15 is a flow chart of the data reception control according to the present invention.
Figure 16:
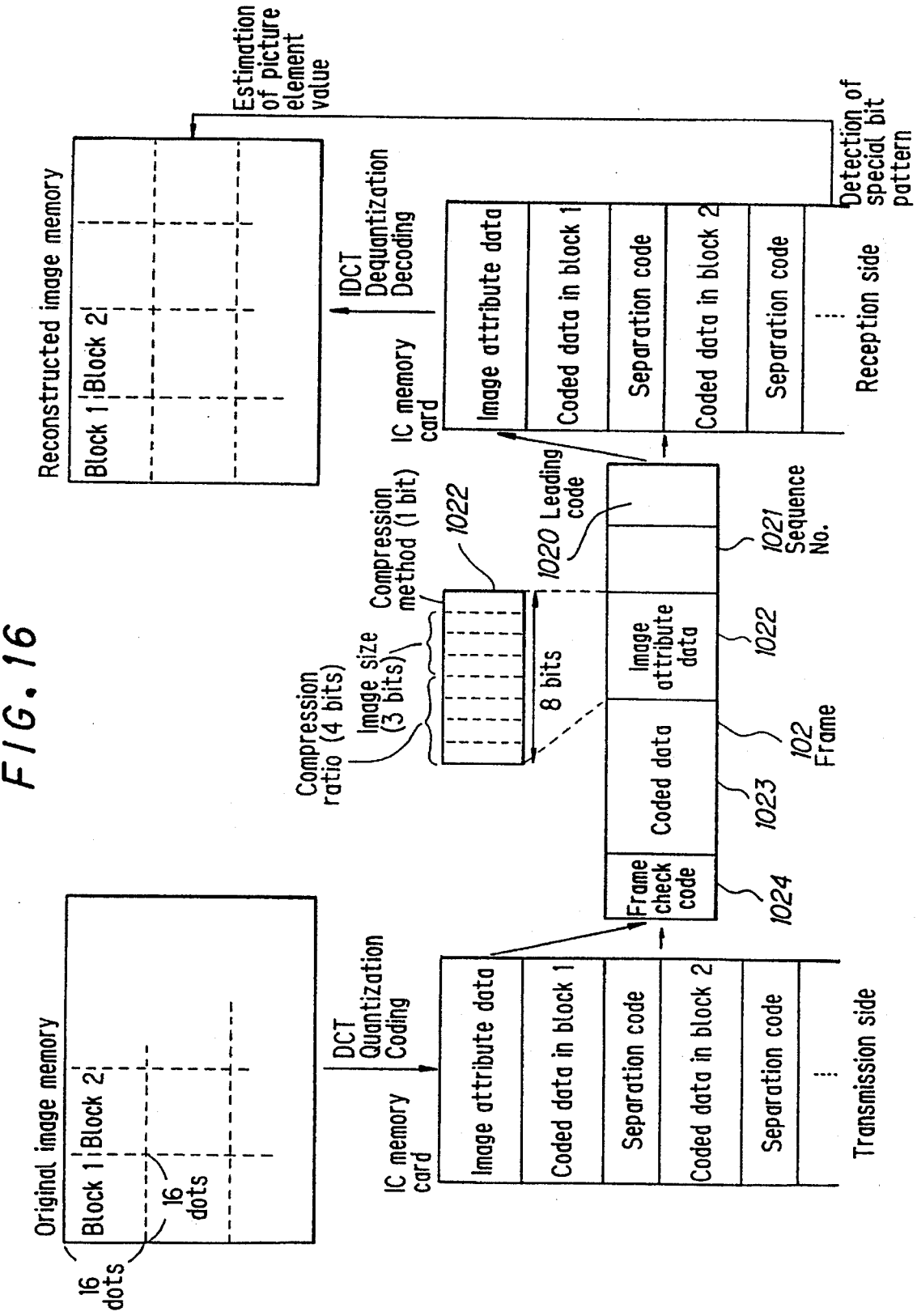
FIG. 16 is an explanatory drawing showing the data transmission/reception control according to the present invention.

FIG. 14 is a flow chart showing one embodiment of the image transmission control in the image data transmission/reception system according to the present invention. FIG. 15 is also a flow chart showing one embodiment of the image reception control. FIG. 16 explains the control operations at the transmitter and receiver sections shown in FIGS. 14 and 15, respectively. The operations of the image data transmission system according to the present invention will be described below with reference to these Figures.

At the transmitter section, an image signal picked up by the video camera 201 is converted to a digital signal by the image input device 202. The digital signal thus obtained is stored into the image memory in the main controller 203. Next, the data in the image memory is subject to DCT, quantization and encoding under the program in the main controller 203, and then compressed before storage into the IC memory card 208. In the image memory 101 shown in FIG. 16, a selected number (horizontal 16 dots by vertical 16 dots in this embodiment; however, it may be horizontal 8 dots by vertical 8 dots) of blocks generated by partitioning an image data is compressed one after another. The data encoded in each of the blocks is assigned a separation code and stored into the IC memory card 209. When all the data of one image have been stored and a next send request is issued, the process shown in FIG. 14 is started under the program in the main controller 203.

As shown in FIG. 14, the image frame generation is done first with creation of image attribute data 1022 such as image size, etc. in the work RAM (in the step S21). The example of attribute data 1022 shown in FIG. 16 includes 8 bits (1 byte) in total consisting of a compression ratio (4 bits), image size (3 bits) and compression system (1 bit). Then, a coded data 1023 for one block is read out (in the step S22). A leading code 1020, sequence number 1021, attribute data 1022 and a frame check code 1024 are added to the coded data 1023 to generate a transmission frame 102 (in the step S23). The transmission frame 102 thus generated is transmitted through a network input/output device 210 and MODEM 200 (in the step S24). It is checked that all the data blocks have successfully been transmitted (in the step S25). If the check result shows that any of the data blocks remains yet to be transmitted, the step S22 and subsequent steps are repeated. When all the data blocks have successfully been transmitted, the transmission is terminated.

Next, the data reception in the transmitter/receiver shown in FIG. 15 will be explained below.

First, it is checked whether data frames have successfully been received or not (in the step S26). The frame check code and sequence number of each frame are judged to know whether the data in the frames are normal or erroneous and whether any of the frames has a portion lost or not (in the step S27). The frames free from error or lost portion have the attribute data extracted and stored into the image attribute data area of the IC memory card (in the step S28) an the coded data is stored as they are into the IC memory card at the receiver section (in the step S29). Any frame having an error or a lost portion has the attribute data discarded (in the step S30) and the coded data is forcibly replaced with a predetermined bit pattern and stored into a corresponding area of the IC memory card (in the step S31).

It is made sure that all frames have successfully been received (in the step S32). The data is expanded and displayed. For these purposes, the image attribute data is used to read blocks one after another from the IC memory card (in the step S33) and the bit pattern of the coded data is checked to be the abovementioned predetermined bit pattern (in the step S34). If the coded data has not the predetermined bit pattern, the data is subjected to decoding, dequantization and inverse DCT before written into the image memory and displayed (in the step S35). If the coded data has the predetermined bit pattern, the correlation among the picture element values having ever been written into the image memory is used to estimate the picture element values of a block having the error, and reconstruct and display an image approximate to the original image (in the step S36). The image data reconstruction using the correlation among the picture elements will be described later.

When the steps S33 and subsequent steps have been done with all the data blocks, the data reception is terminated (in the step S37).

According to the present invention, a block of 16 dots by 16 dots is transmitted with an attribute data of 1 byte added for each block. Therefore, the amount of transmitted data is slightly larger than that in the transmission of one attribute data per screen. Even if any transmission error takes place, the attribute data can be positively detected at the receiver section, and the image data itself can be approximately reconstructed by a process such as utilization of the correlation among the picture elements, such as interpolation, etc. Therefore, an expanded and displayed image can always be received positively without any remarkable distortion. Namely, even if any error takes place during transmission, it is not necessary to transmit all the data again.

More particularly, attribute data can be simplified for transmission per frame and it can be extracted positively from a normal frame for image reconstruction. Any coded data in a frame having a transmission error detected therein is discarded, and the correlation among the image data reconstructed from error-free decodable data is utilized to estimate the picture element value in which the error has taken place, thereby permitting to reconstruct an image data approximate to the original image.

According to the aforementioned embodiment of the present invention, the attribute data include 4 bits for attribute data, 3 bits for image size and 1 bit for compression system. However, a kind and number of included data, bit length, etc. may be set as necessary. The compression is done in 16 dots by 16 dots. Of course, this size may be other than 16 dots by 16 dots.

The interpolation of image data according to the present invention will be described below.

Generally, when an error has been detected in a received data, the data having the error is discarded and treated as a lost one. The lost data is interpolated by the self-correcting type forward error correction (FEC) to provide an image data for the lost portion of the received image.

The above-mentioned interpolation of image data is a linear or curvilinear interpolation.

Figure 18:
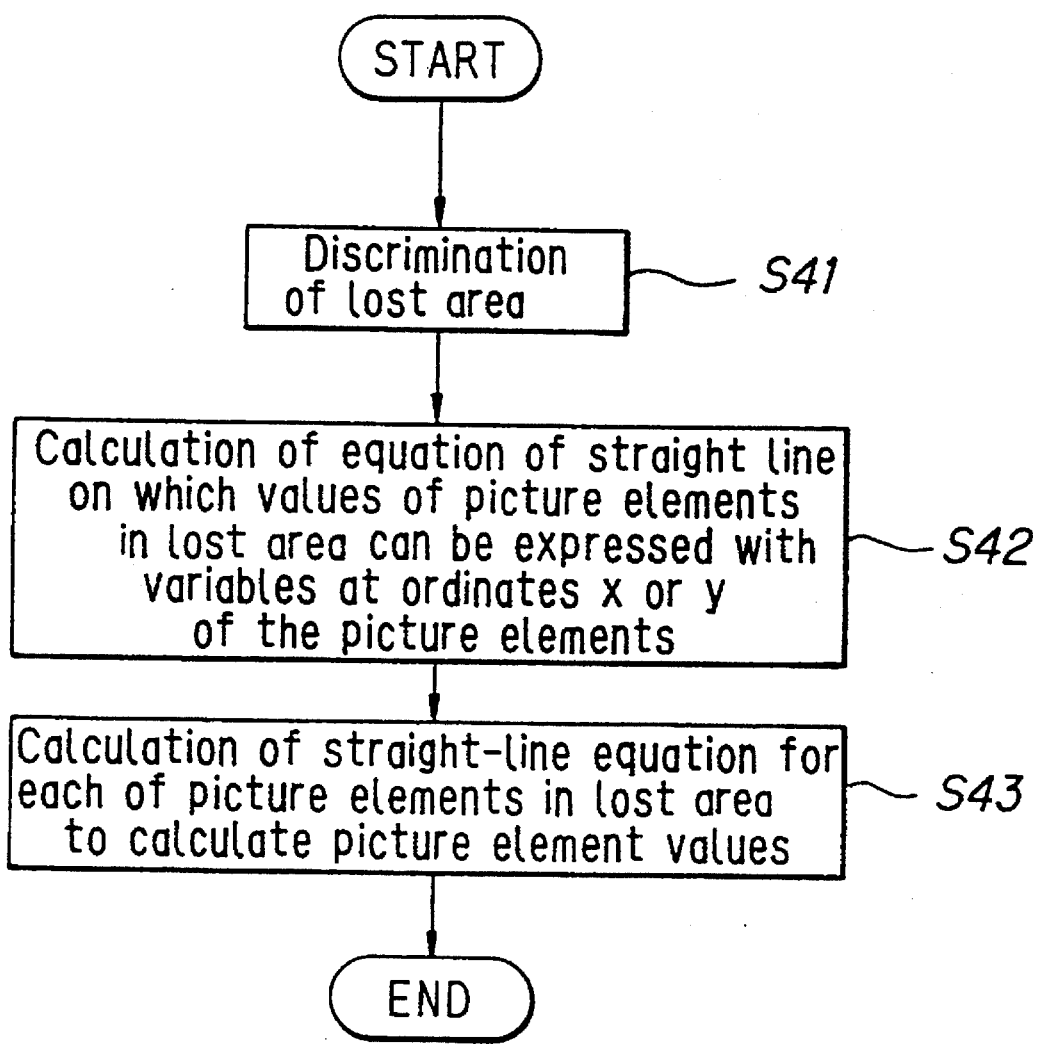
FIG. 18 is a flow chart of the linear interpolation according to the present invention.

FIG. 17(A) explains an original image. It is assumed that an image data having a distribution of picture element values shown in this Figure is transmitted and a portion A in the image data is lost at the receiver section (as shown in FIG. 17(B)). The image data in the lost portion is linearly interpolated as will be described below. As shown in FIG. 18, the lost portion is judged (in the step S41), then an equation of a straight line expressed with a variable at the ordinate $x$ or $y$ of the picture element value is calculated to interpolate each picture element in the lost portion (in the step S42). The equation is calculated to obtain each picture element value of the lost portion (in the step S43) to interpolate the image data in the lost portion.

Figures 19, 20:
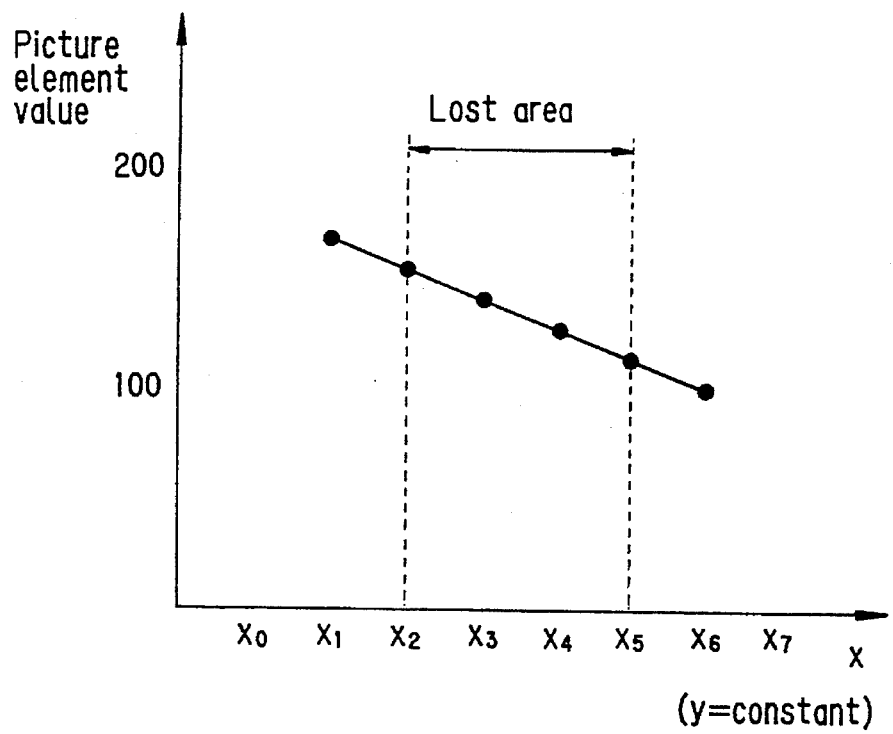
FIG. 19 is an explanatory drawing showing the concept of the linear interpolation according to the present invention.
FIG. 20 shows the concept of the picture element distribution by the x-axial linear interpolation according to the present invention.

For this interpolation, the straight line equation is calculated as shown in FIG. 19. More particularly, if it is assumed that $y$=(constant), a straight line connecting the picture element values x=x1 and x=x6 adjacent to the lost portions (x2 to x5) in a normally received image data is calculated to provide an picture element in the lost portion on the straight line as each picture element value of the lost portion.

In the curvilinear interpolation, a predetermined curve connecting the picture elements x=x1 and x=x6 adjacent to the lost portion (x2 to x5) is used to obtain each picture element value in the lost portion.

FIG. 20 shows an image element value distribution of a received image obtained by the linear interpolation in the x-direction on the assumption that $y$=(constant). Each of the picture element values in the portion A in FIG. 20 is an interpolated one. The interpolated picture element value and averaged picture element value of the whole lost portion A are different by 90 and 40 at maximum from those of the original image shown in FIG. 17.

FIG. 21 shows an image element value distribution of a received image obtained by the linear interpolation in the y-direction on the assumption that $x$=(constant). The maximum interpolated picture element value and averaged picture element value of the whole lost portion A are different by 60 and 20, respectively, from those of the original image shown in FIG. 17.

As shown in FIGS. 20 and 21, the linear interpolation in the x-direction results in a different picture element value from that resulted from the linear interpolation in the y-direction.

A higher-accuracy interpolation derived from an improvement of the above-mentioned interpolation will be explained below concerning the image data reconstruction by utilizing the aforementioned correlation among the picture elements.

The interpolation according to the embodiment uses a weighted mean as will be described below.

It is assumed that the coordinates of each picture element in a received image is (x, y), the value of a picture element p in the lost portion is p(x, y), the value of a picture element q in the normally received portion is q(x, y), the Euclidean distance between the picture elements p and q is r, the angle defined between a vector directed from the picture element p to the picture element q and x-axis is θ and the weight is w(r, θ). For the interpolation, the following formula (3) of weighted mean is used to estimate each picture element value p(x, y) of the lost portion. It should be noted that summing is done with all (x, y) in the formula (3).

$$p(x, y)=\Sigma w(r, \theta)q(x, y)/\Sigma w(r, \theta) \quad (3)$$

Namely, a weighting w(r, θ) depending upon the distance r between the picture element q in the normally received portion and the picture element p in the lost portion and the direction θ is done to determine a weighted mean for interpolation of the image data in the lost portion. Therefore, each picture element in the lost portion can be determined from the picture element values in a plurality of normally received portions in a two-dimensional area. Thus, it is possible to attain a high level of image data interpolation, thereby accurately reconstructing the original image.

According to the embodiment of the present invention, the interpolation of the image data in the lost portion is done after completion of all image data in the original image. Therefore, so many picture element values q(x, y) as possible of the normally received picture elements surrounding the lost portion can be used to further improve the accuracy of the interpolation.

Figure 22:
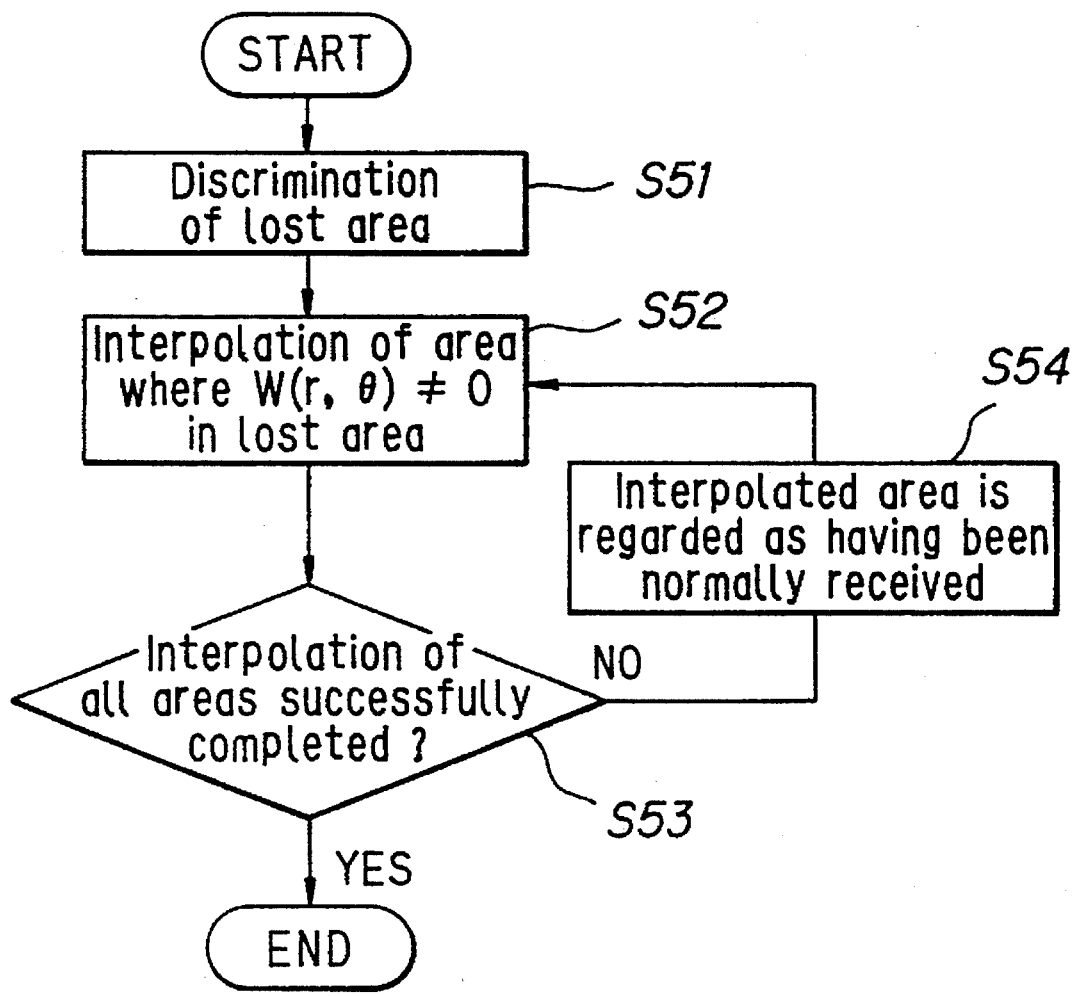
FIG. 22 is a flow chart of the substitution interpolation according to the present invention.

In case an image data having a picture element distribution shown in FIG. 17(A), for example, is transmitted and the portion A of the image data as shown in Figure is lost at the receiver section (as shown in FIG. 17(B)), the image data in the lost portion A is interpolated according to this embodiment as will be discussed below. As shown in FIG. 22, the lost portion A is judged (in the step S51), an area (picture elements) having a non-zero weight w(r, θ) in the lost portion A is interpolated through calculation of the above formula (3), and the interpolated area (picture elements) is regarded as normally received (in the step S54). These steps are repeated until the interpolation of the whole lost portion is completed.

The image data thus interpolated in the lost portion is replaced with the lost portion of the output image data shown in FIGS. 1, 2 and 9.

To minimize the calculation, the weight w(r, θ) is simplified as indicated with the formulae (4) to (8). Interpolations by calculations of these formulae will be described below.

$$w(r, \theta)=0 \quad (4)$$

where r>2 and θ=all angles.

$$w(r, \theta)=0 \quad (5)$$

where r=all distances, θ≠N×45°, N=0, 1, 2, 3, 4, 5, 6, 7

$$w(1, 0)=w(1, 90)=w(1, 180)=w(1, 270)=2 \quad (6)$$

$$w(2, 0)=w(2, 90)=w(2, 180)=w(2, 270)=1 \quad (7)$$

$$w(\sqrt{2}, 45)=w(\sqrt{2}, 135)=w(\sqrt{2}, 215)=w(\sqrt{2}, 315)=1 \quad (8)$$

As seen from the formulae (4) through (8), the weight w(r, θ) is used to calculate the formula (3) for each picture element in a lost portion based on the values of 12 picture elements in total consisting of 8 picture elements surrounding the picture element in the lost portion and 2 picture elements in the x- and y-directions, respectively, outside the 8 surrounding picture elements (12 normally received picture elements in 8 directions). The interpolation result from this interpolation are as shown in FIG. 23.

Figure 23:
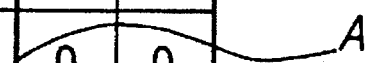
FIG. 23 shows the concept of the picture element distribution by the substitution interpolation (in FIG. 22) according to the present invention.

Each picture element in the portion A in FIG. 23 is an interpolated one. The maximum value of these interpolated picture elements and averaged value of the entire lost portion are different by 57 and 21.2 from those of the picture element values of the original image in FIG. 17. Namely, the embodiment shown in FIG. 18 can provide a further accurate interpolation.

According to the embodiment according to the present invention, a lost portion is interpolated based on a data in the normally received image portion. However, the data obtained by the interpolation may be regarded as a normally received one and the interpolation of the lost portion may be done based on the data regarded as normally received one.

In the aforementioned embodiment of the present invention, the interpolation is done with 12 picture elements of which the 8 ones surround a picture element to be interpolated. However, the present invention is not limited only to this method of interpolation but image interpolation can be done based on a selected number of picture elements in a selected number of directions. Preferably for a higher level of accuracy, however, interpolation should be done from all picture elements surrounding a to-be-interpolated picture element from all directions.

What is claimed is:

1. A method for transmission of image data, wherein an input digital image data is transmitted by encoding the source image data, encoding the coded image data for error correction and modulating it transmission over a transmission line, and is reconstructed by demodulating the image data received over the transmission line, decoding it for error correction and decoding it to the source image, comprising the steps of:

partitioning the input data of a source image into a predetermined number of data blocks each of which including a plurality of picture elements from which the source image can be decoded;

encoding each partitioned block for the source image and also encoding for correction of an error, if any, in the block;

decoding each of the received blocks for error correction to detect any error caused in the block during transmission;

discarding a block of the image data which has been decoded to the source image and contains a transmission-caused error or a block to which the error has been propagated as it is;

interpolating the block of the image data containing the transmission-caused error or the block to which the error has been propagated as it is, with a previously stored substitution block which can be decoded and as set in the place of the block containing the error, and then reconstructing the image data.

2. A method as set forth in claim 1, wherein when a correct data other than any interpolated data, is required at the receiver section, a send request for an image data is arbitrarily made for data transmission from the transmitter section.

3. A method for transmission of image data according to claim 1, further comprising a step, after the step of reconstructing the image data, of replacing in order the substitution block with a picture element value estimated from the correlation with blocks adjacent to the block in which the error has been detected.

4. An apparatus for transmission of image data, comprising:

a transmitter section having:
        an image data partitioning unit which partitions an input image data into a predetermined number of blocks which can be decoded to the source image,
        a source image encoder which encodes each of the partitioned data blocks and an error correction encoder, and
        a modulator which converts the coded data to a signal suitable for transmission on a transmission line used; and
    a receiver section having a demodulator which receives and converts the modulated signal to provide a digital signal,
        an error correction decoder which detects an error, if any, in the digital signal demodulated by the demodulator, and
        a source image decoder which decodes an error-free image data as it is,
        the receiver section further having an image data interpolator which interpolates, if an error has been detected by the error correction decoder, a data block in which the error is included or other data block to which the error has been propagated, with a substitution data.

5. An apparatus as set forth in claim 4, wherein an interpolation data is stored beforehand in the image data interpolator and used as the substitution data when an error is detected by the error correction decoder.

6. An apparatus as set forth in claim 4, further comprising an image data interpolator which uses as the substitution data a data estimated based on the correlation with the block in which an error has been detected.

7. An apparatus as set forth in claim 4, further comprising an image data interpolator which uses as the substitution data a data estimated based on the correlation with the blocks adjacent to a block in which an error has been detected.

8. A method for transmission of image data, comprising the steps of transmitting an input digital image data by encoding the source image data, encoding the coded image data for error correction and modulating it for transmission over a transmission line, and demodulating the image data received over the transmission line, decoding it for error correction, decoding it to the source image and providing a reconstructed image data, wherein at the transmission side, a plurality of MCUs, minimum units of image data to be subject to source image encoding, is taken as a transmission block, a HDLC frame is generated for each transmission block and used as a modulated signal; and at the reception side, the received and demodulated signal is checked for any transmission error for each HDLC frame, the transmission block in an HDLC frame in which a transmission error has been detected is replaced with a substitution block stored beforehand and is subjected to source image decoding.

9. An image data receiver, comprising:

a demodulator which receives and demodulates a modulated signal transmitted over a transmission line and which carries an HDLC frame having a plurality of MCUs, minimum units of image data to be subject to source image encoding of digital image data;

an HDLC frame disassembler which checks the signal output of the demodulator for any transmission error in each HDLC frame, disassembles transmission blocks in an HDLC frame having no transmission error into individual MCUs, while delivering a signal indicative of a transmission error detected in an HDLC frame, replacing the transmission block in that HDLC frame with an external substitution block and then disassembling the substitution block into individual MCUs;

a memory in which different kinds of substitution blocks are stored beforehand; and a transmission block substitution unit which, when supplied with a signal indicative of the error from the HDLC frame disassembler, reads a suitable substitution block from the memory and supplies it to the HDLC frame disassembler, the output of the HDLC frame disassembler being subjected to source image decoding to reconstruct the digital image data.

10. An image data receiver as set forth in claim 9, the transmission block substitution unit comprising:

a parameter calculator which, when supplied with a signal indicative of an error, calculates a parameter from a compressed/expanded data extracted from a transmission block in a preceding frame having no error;

a substitution block selector/generator which uses the calculated parameter to select a suitable substitution block from the memory and delivers a signal which designates the number for the selected substitution block;

an address calculator which calculates an address in the memory from the block number designation signal and delivers an address corresponding to the designated number; and a memory data transfer unit which receives the address signal from the address calculator and transfers a substitution block at the address in the memory to the HDLC frame disassembler.

11. An image data receiver as set forth in claim 10, wherein the transmission block substitution unit has a function of giving an arbitrary image data to the transmission block to write a substitution block into the memory.

12. A method for transmission of image data, in which an image data is partitioned into a plurality of blocks, image data in each block is subject to orthogonal transform and then a coded data generated by compression after encoding the image data in each block and an attribute data necessary for restoration of the image data by decoding and inverse orthogonal transform at the reception side are transmitted; wherein at the transmission side, the coded data in each block is additionally assigned the attribute data and a frame check code to form a data frame for transmission; and at the reception side, each time one of the data frames is received, the frame check code added to the frame is used to check for any transmission error in the frame and the attribute data is extracted from a frame having no error to restore a still image.

13. A method as set forth in claim 12, wherein, when a transmission error is detected in a frame as a result of the error checking with the frame check code, the coded data in that frame is reformatted into a predetermined special bit pattern once and the special bit pattern is replaced with a value estimated based on the correlation with the adjacent image data on the display screen at the time of image restoration.

14. A method as set forth in claim 12, wherein the orthogonal transform is a discrete cosine transform.

15. A method as set forth in claim 12, wherein the attribute data is a data of 1 byte consisting of 4 bits for compression ratio, 3 bits for image size and 1 bit for compression method.

16. An apparatus for transmission of image data, comprising:

a first means of partitioning an image data into a plurality of blocks, orthogonal-transforming image data in each block and compressing it by encoding to provide a coded data;

a second means of adding to the coded data in each block a frame check code and an attribute data necessary for restoration of a still image by decoding and inverse orthogonal transform, to thereby form a frame for transmission; and a third means of checking for any transmission error in each received frame with reference to the frame check code added to that frame and extracting the attribute data from a frame having no such error for restoration of the image.

17. A method as set forth in claim 16, wherein the third means is so designed to reformat, when a transmission error is detected in a frame as a result of the error checking with the frame check code, the coded data in that frame into a predetermined special bit pattern once and replacing the special bit pattern with a value estimated from the correlation with the adjacent image data on the display screen at the time of image restoration.

18. A method of image data interpolation in an image data transmission in which an input digital image data is subjected to source image encoding, forward error correction encoding and then to modulation, and transmitted over a transmission line; and the data received over the transmission is subjected to demodulation, error correction decoding and source image decoding to provide a reconstructed image data, comprising the steps of:

determining an equation in which variables at coordinates of a picture element in the image data, having incurred an error or loss during the transmission, are expressed with those at coordinates of picture elements adjacent to that picture element;

calculating the equation to regenerate each picture element incurring the error or loss; and using the regenerated picture element to interpolate the image data incurring the error or loss, thereby providing a reconstructed image data.

19. A method for transmission of image data, comprising the steps of transmitting an input digital image data by encoding the source image data, encoding the coded image data for error correction and modulating it for transmission over a transmission line, and demodulating the image data received over the transmission line, decoding it for error correction, decoding it to the source image and providing a reconstructed image data, wherein, when the image data has incurred an error or loss during the transmission, a weighted mean is determined by weighting the picture element values in the normally received portion of the image data in dependence of a distance between the picture elements in the normally received portion and those in the lost portion and the orientations of the normally received picture elements to interpolate the image data in the error or lost portion and a reconstructed image data is provided after the interpolation.

20. A method as set forth in claim 19, wherein the interpolation of the image data in the error or lost portion is done after all the image data of an original image have been received.

21. A method for transmission of image data, comprising the steps of transmitting an input digital image data by encoding the source image data, encoding the coded image data for error correction and modulating it for transmission over a transmission line, and demodulating the image data received over the transmission line, decoding it for error correction, decoding it to the source image and providing a reconstructed image data, wherein the input data of a source image is partitioned into a predetermined number of data blocks from which the source image can be decoded;

each partitioned block is coded for the source image and also coded for correction of an error, if any, in the block;

each of the received blocks is decoded to detect any error caused in the block during transmission;

a block of the image data of which each block has been decoded to the source image that contains a transmission-caused error, or a block to which the error has been propagated as it is, is corrected with a picture element value estimated from the correlation of the block in consideration with its associated block; and then the image data is reconstructed, wherein when a correct data other than any interpolated data, is required at the receiver section, a send request for an image data is arbitrarily made for data transmission from the transmitter section.

22. A method as set forth in claim 21 wherein the associated blocks are those adjacent to the block in which the error has been detected, wherein when a correct data other than any interpolated data, is required at the receiver section, a send request for an image data is arbitrarily made for data transmission from the transmitter section.

23. An apparatus for transmission of image data, comprising:

a transmitter section having;

an image data partitioning unit which partitions an input image data into a predetermined number of blocks which can be decoded to the source image, a source image encoder which encodes each of the partitioned data blocks and an error correction encoder, and a modulator which converts the coded data to a signal suitable for transmission on a transmission line used, and a receiver section having;

a demodulator which receives and converts the modulated signal to provide a digital signal, an error correction decoder which detects an error, if any, in the digital signal demodulated by the demodulation, and a source image decoder which decodes an error-free image data as it is;

said receiver section further including an image data interpolator which interpolates, if an error has been detected by the error correction decoder, a data block in which the error is included or other data block to which the error has been propagated, with a substitution data, said interpolator having memory means in which an interpolation data which can be decoded is stored beforehand, and said interpolation data having used as the substitution data when then the error is detected by the error correction decoder, and said interpolator adapted to further interpolate certain block of said interpolation data with a data estimated based on the correction with the blocks adjacent to the interpolated block.

24. A method for transmission of digital image data including the steps of transmitting an input digital image data by encoding the image data and modulating it for transmission over a transmission line, and demodulating the image data received over the transmission line, decoding it to the image data and providing a reconstructed image data, comprising;

at the transmission side, a plurality of MCUs (minimum units of image data) is taken as a transmission block, a HDLC frame is generated for each transmission block and used as a modulated signal; and at the reception side, the received and demodulated signal is checked for any transmission error for each HDLC frame, the transmission block in the HDLC frame in which a transmission error has been detected is discarded.

a parameter is calculated from a compressed/expanded data extracted from the transmission block in a preceding frame having no error, the calculated parameter is used to select a suitable substitution block among a plurality of substitution blocks stored beforehand in memory means, a signal indicative of number for the selected substitution block is delivered, an address of the substitution block in the memory means is calculated from the block number designation signal, the selected substitution block is read out from the memory means, the transmission block in the HDLC frame having transmission error is replaced with the selected substitution block, and then disassembled into individual MCUs to be subjected to source image decoding for the reconstruction of the digital image data.

25. A digital image data receiver, comprising:

a demodulator which receives and demodulates a modulated signal transmitted over a transmission line and which carries an HDLC frame having a plurality of MCUs, minimum units of image data to be subject to source image encoding of digital image data;

an HDLC frame disassembler which checks the signal output of the demodulator for any transmission error in each HDLC frame, disassembles transmission blocks in an t HDLC frame having no transmission error into individual MCUs, while delivering a signal indicative of a transmission error detected in an HDLC frame, replacing the transmission block in that HDLC frame with an external substitution block and then disassembling the substitution block into individual MCUs;

a memory in which different kinds of substitution blocks are stored beforehand; and a transmission block substitution unit including, a parameter calculator which, when supplied with a signal indicative of the error from the HDLC frame disassembler, calculates a parameter from a compressed/expanded data extracted from a transmission block in a preceding frame having no error, a substitution block selector/generator which uses the calculated parameter to select a suitable substitution block from the memory and delivers a signal indicative of the number for the selected substitution block, an address calculator which calculates an address in the memory from the block number designation signal and delivers an address corresponding to the designated number, and a memory data transfer unit which receives the address signal from the address calculator and transfers a substitution block at the address in the memory to the HDLC frame disassembler, the output of the HDLC frame disassembler being subjected to source image decoding to reconstruct the digital image data.

26. A method for transmission of image data in which an image data is partitioned into a plurality of blocks, image data in each block is subject to orthogonal transform and then a coded data generated by compression after encoding the image data in each block and an attribute data necessary for restoration of the image data by decoding and inverse orthogonal transform at the reception side are transmitted, wherein at the transmission side, the coded data in each block is additionally assigned the attribute data and a frame check code to form a data frame for transmission, and at the reception side, each time one of the data frames is received, the frame check code added to the frame is used to check for any transmission error in the frame, the attribute data is extracted from a frame having no error to restore a still image, and when the transmission error is detected in a frame as a result of the error checking with the frame check code, the coded data in that frame is reformatted into a predetermined special bit pattern once and the special bit pattern is replaced with a value estimated based on the correlation with the adjacent image data on the display screen at the time of image restoration.

27. An apparatus for transmission of image data, comprising:

first means for partitioning an image data into a plurality of blocks, orthogonal-transforming image data in each block and compressing it by encoding to provided a coded data;

second means for adding to the coded data in each block a frame check code and an attribute data necessary for restoration of a still image by decoding and inverse orthogonal transform, to form a frame for transmission; and third means for checking any transmission error in each received frame with reference to the frame check code added to that frame, and extracting the attribute data from a frame having no such error for restoration of the image, said third means being so designed to reformat, when the transmission error is detected in a frame as a result of the error checking with the frame check code, the coded data in that frame into a predetermined special bit pattern once and the special bit pattern is replaced with a value estimated based on the correlation with the adjacent image data on the display screen at the time of image restoration.

* * * * *